United States Patent
Pisipati et al.

(10) Patent No.: US 11,481,188 B1
(45) Date of Patent: Oct. 25, 2022

(54) APPLICATION LAUNCH DELAY AND NOTIFICATION

(71) Applicant: Amazon Technologies, Inc., Seattle, WA (US)

(72) Inventors: Prashant Pawan Pisipati, La Palma, CA (US); Allen Wang, Glendale, CA (US); Jordan Sinclair, Irvine, CA (US); Song Chen, Irvine, CA (US); Mark Conrad Kockerbeck, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/907,905

(22) Filed: Jun. 22, 2020

(51) Int. Cl.
*G06F 3/16* (2006.01)
*G06F 9/54* (2006.01)
*G10L 15/22* (2006.01)
*G06F 9/48* (2006.01)

(52) U.S. Cl.
CPC ............ *G06F 3/167* (2013.01); *G06F 9/4843* (2013.01); *G06F 9/542* (2013.01); *G10L 15/22* (2013.01); *G10L 2015/223* (2013.01)

(58) Field of Classification Search
CPC ......... G06F 3/167; G06F 9/542; G10L 15/22; G10L 2015/223
See application file for complete search history.

(56) References Cited

U.S. PATENT DOCUMENTS

| | | | | |
|---|---|---|---|---|
| 7,739,681 | B2 * | 6/2010 | Sinha | G06F 8/61 713/1 |
| 9,479,630 | B1 * | 10/2016 | Chowdhury | H04M 1/72403 |
| 9,728,188 | B1 * | 8/2017 | Rosen | G10L 25/51 |
| 9,972,318 | B1 * | 5/2018 | Kelly | G10L 15/22 |
| 10,332,513 | B1 * | 6/2019 | D'Souza | G10L 15/183 |
| 2003/0101060 | A1 * | 5/2003 | Bickley | G10L 15/08 704/275 |
| 2008/0208684 | A1 * | 8/2008 | Hamilton | G06Q 30/02 705/14.61 |
| 2009/0199122 | A1 * | 8/2009 | Deutsch | G06F 9/445 715/771 |
| 2013/0244633 | A1 * | 9/2013 | Jacobs | H04M 1/72415 455/415 |
| 2015/0160951 | A1 * | 6/2015 | Iyengar | H04L 67/04 715/712 |
| 2016/0349953 | A1 * | 12/2016 | Adler | G06Q 10/109 |
| 2019/0065975 | A1 * | 2/2019 | White | G06F 7/08 |
| 2019/0075365 | A1 * | 3/2019 | Awan | H04N 21/4312 |
| 2019/0179606 | A1 * | 6/2019 | Thangarathnam | G06F 40/30 |
| 2020/0234697 | A1 * | 7/2020 | Webster | G10L 13/00 |

* cited by examiner

*Primary Examiner* — Amy M Levy
(74) *Attorney, Agent, or Firm* — Lee & Hayes, P.C.

(57) ABSTRACT

Systems and methods for application launch delays and notifications are disclosed. For example, a URL link to enable an application may be selected on a user device, and a user interface allowing the user to enable the application at a current time or at a future time may be displayed. When the user input indicates selection of the future time, a notification may be generated and provided to the user device and/or the voice interface device. The voice interface device may output the notification and, when user input indicates an intent to enable the application, the application may be enabled for use by the voice interface device.

20 Claims, 11 Drawing Sheets

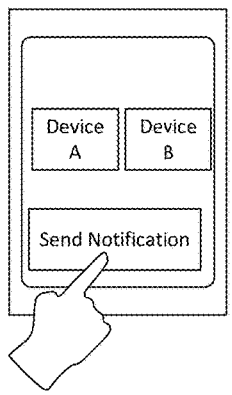
FIG. 5A
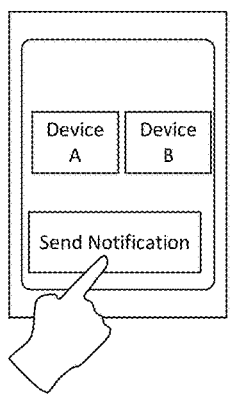
FIG. 5B
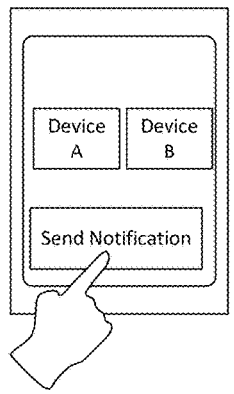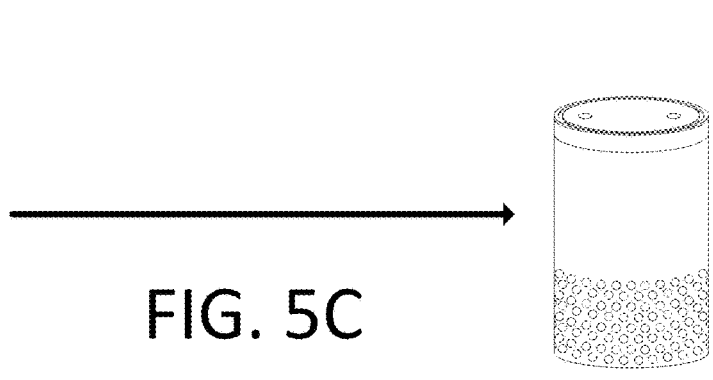
FIG. 5C
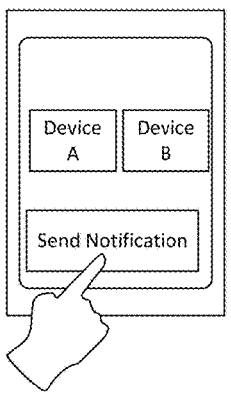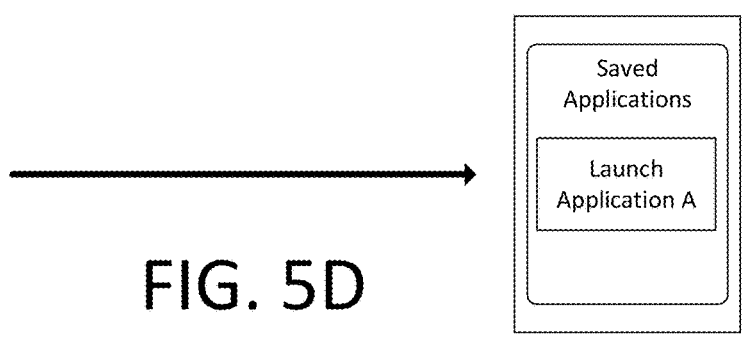
FIG. 5D

700

702 Receive, from user device, first data indicating that website has received request to launch application associated with website, application configured to be utilized with voice interface device

704 Cause user interface to be displayed on user device, user interface including: first portion configured to accept first user input to launch application for use by voice interface device; and second portion configured to accept second user input requesting to delay launch of application until occurrence of trigger event

706 Receive second data indicating user device has received second user input

708 Generate, in response to receiving second data, third data representing notification that launch of application was delayed

710 Determine that trigger event has occurred, trigger event corresponding to when output of notification on voice interface device is to occur

712 Send, to voice interface device and in response to trigger event occurring, command to output notification

714 Receive user input data responsive to notification to launch application

716 Cause application to be launched for use by voice interface device

FIG. 7

APPLICATION LAUNCH DELAY AND NOTIFICATION

BACKGROUND

Electronic devices may be configured to perform one or more actions. Such actions may be associated with one or more applications configured to utilize the electronic devices to perform the actions. Described herein are improvements in technology and solutions to technical problems that can be used to, among other things, improve use of electronic devices to perform actions utilizing applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5A illustrates a conceptual diagram of a first methodology for delaying application launches.

FIG. 5B illustrates a conceptual diagram of a second methodology for delaying application launches.

FIG. 5C illustrates a conceptual diagram of a third methodology for delaying application launches.

FIG. 5D illustrates a conceptual diagram of a fourth methodology for delaying application launches.

FIG. 7 illustrates a flow diagram of an example process for application launch delays and notifications.

DETAILED DESCRIPTION

Figure 1:
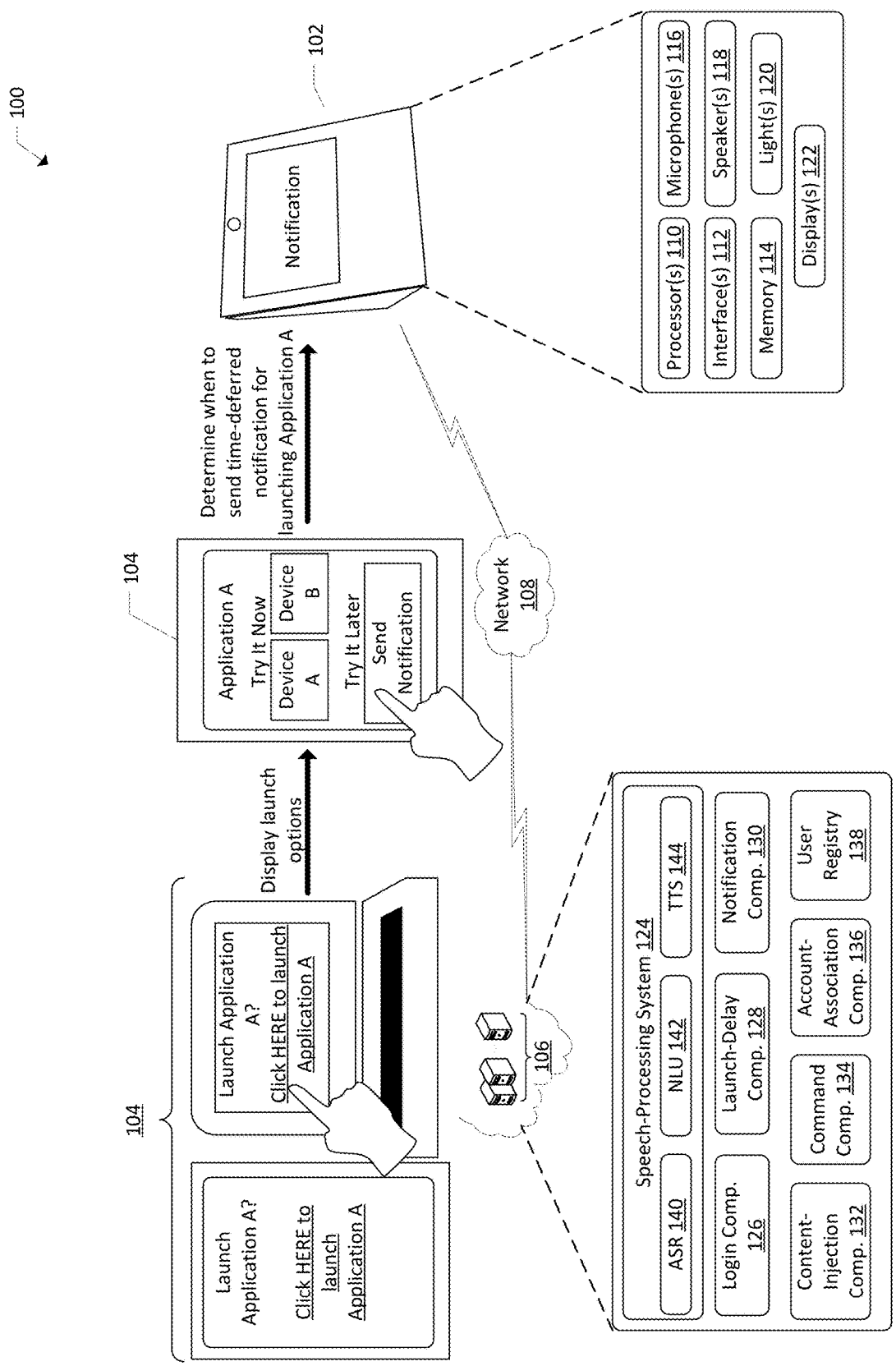
FIG. 1 illustrates a schematic diagram of an example environment for application launch delays and notifications.

Systems and methods for application launch delays and notifications are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., smart speaker devices, mobile phones, tablets, personal computers, automobiles, wearables (e.g., watches, rings, earbuds), televisions, appliances, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example.

A user of an electronic device may be browsing internet content or otherwise viewing content from one or more websites on the electronic device. In examples, a given website may include a selectable portion associated with a request to enable an application associated with the website for use on one or more electronic devices, such as voice interface devices. The selectable portion may correspond to a link, such as a link associated with a uniform resource locator. The selection portion itself may include one or more forms, such as a button or otherwise an image, text, etc. For example, a given website may be associated with one or more games and/or other functionality, such as a trivia game. A portion of the website may inform the user that a given trivia game is configured to be played using a voice interface device and that, if the user desires, the user can enable the trivia game for use on one or more voice interface devices associated with a user profile of the user by selecting the selectable portion of the website. The electronic device may receive user input indicating selection of the selectable portion, which may initiate enablement of the application for use via the voice interface devices. It should be understood that in addition to, or alternatively from, a selectable portion being associated with a website, the request to launch an application may be received from one or more other devices and/or mediums. For example, a television commercial, movie, advertisement, etc. may provide an indication that the application is available and user input may be received on one or more devices displaying such content to request launch of the application. For example, a user may utilize a voice interface device to request that the application associated with currently-displayed content be launched. Other user input, such as utilization of a keyboard, touchscreen, remote control, etc. may be accepted as well.

To do so, a remote system associated with the voice interface devices, such as a remote system that includes a speech-processing system, may receive, from the electronic device, an indication that the application has been requested to be enabled. The remote system may determine whether the electronic device has installed a companion application associated with the remote system. For example, if the user has a voice interface device associated with the remote system, a portion of the out-of-the-box experience when setting up the voice interface device may have been to download or otherwise install the companion application on one or more user devices, which may enhance the user's experience of utilizing the voice interface device. In certain examples, the electronic device from which the enablement request was received may have the companion application installed on it, while in other examples the electronic device may not have the companion application installed. When the companion application is not installed, the remote system may determine whether the uniform resource locator (URL) associated with the link in the website is a valid URL or otherwise whether the URL is active and accurately allows access to a resource associated with the remote system for enabling applications. In instances where the URL is not valid, an error message may be displayed on the electronic device as well as, in examples, directions for other potential ways to enable the application.

In instances where the URL is valid, a login component of the remote system may determine whether the electronic device is actively logged in to a user account associated with the remote system. For example, the electronic device may be automatically logged in to the user account, and/or the user may have logged in to the user account at a time prior to selection of the link to enable the application. By way of example, the remote system may be associated with a marketplace system, a smart-home system, an email system, etc. where the user has logged in utilizing the user account to utilize the one or more systems. In these examples, particularly when user consent to do so has been provided, the remote system may determine that the electronic device is actively logged in to the user account. When the electronic device is not actively logged in to the user account, a login page may be displayed that may allow the user to provide user input for logging in to the user account.

Once logged in, the remote system may determine whether user account data indicates that one or more voice interface devices are associated with the user account data. For example, a user may have one, multiple, or no voice interface devices, and/or the user may not have associated a voice interface device with the user account data. In instances where the user account data indicates that no voice interface devices are associated with the user account data, the remote system may cause the electronic device to display a user interface indicating that no voice interface devices are associated with the user account data and may provide directions for acquiring voice interface devices and/or for associating voice interface devices with the user account data. In instances where the user account data indicates one or more voice interface devices are associated with the user account data, the remote system may determine naming indicator(s) of the voice interface device(s) and may cause the electronic device to display a user interface indicating the naming indicators. In examples, the user interface may also be utilized to display device type indicators of the voice interface devices and/or other information associated with the voice interface devices. The naming indicators and/or other information associated with the voice interface devices may be displayed in a first portion of the user interface associated with "try it now" functionality. This first portion of the user interface may be utilized by the user when the user desires to enable and use the application associated with the website at a current time. For example, when the user is in the environment where the voice interface device is disposed and desires to currently utilize the application in conjunction with the voice interface device, the user may select a portion of a screen of the electronic device corresponding to the naming indicator of the voice interface device to be used. In addition to the above, a second portion of the user interface may include a selectable portion associated with "try it later" functionality. This second portion of the user interface may be utilized when the user desires to enable and use the application at a later time. In these examples, the second portion of the user interface may include a selectable portion associated with sending a notification and/or otherwise delaying enablement and/or use of the application until a time after the current time.

In examples where user input from the electronic device indicates selection of the second portion of the user interface associated with the "try it later" functionality, a launch-delay component of the remote system may determine whether a notification is already pending in association with the application and the user account data. For example, the user and/or another user associated with the user account data may have previously requested that a notification for enabling the application be sent. In these examples, the remote system may determine that a notification for enabling the application in association with the user account data has already been sent and may determine to refrain from sending another notification. In instances where such a notification is not already pending, an account-association component of the remote system may determine whether account association requirements are associated with the application. For example, some applications may be associated with sensitive information such as financial data, health-related data, etc. and/or it may be beneficial for the application to have access to the user account data and/or to an account specific to the application. In these examples, enablement of the application may require or optionally request that the user account data and/or the account specific to the application be associated with the application. To do so, the remote system may cause the electronic device to display an account association page. The electronic device may receive user input associated with account association and, once associated, the notification component may generate and send a notification to one or more of the voice interface devices and/or one or more other user devices associated with the user account data.

For example, a command component of the remote system may send data representing the notification to a voice interface device along with a command that causes the voice interface device to display an indication that a notification is available via the voice interface device. In some examples, the data representing the notification may be sent concurrently with the command, while in other examples the commands may be sent and the data representing the notification may be sent at a later time, as discussed more fully below. The indication of the notification may include display of lights and/or output of sounds, for example, indicative of a pending notification. User input data may be received via the voice interface device, such as by a microphone of the voice interface device receiving audio representing a user utterance to output the notification. Corresponding audio data may be sent to the remote system for speech processing, and the command component may send a command to the voice interface device to output audio representing the notification. The notification may indicate that enablement of the application has been delayed and may request additional user input indicating a desire to enable the application. In other examples where the device to which the notification was sent includes a screen, the notification may include image data and/or text data that may be displayed on the screen. In still other examples, instead of a notification indicator or in addition to the notification indicator, the notification may be output at a given time and/or a given day without requiring user input. In these examples, when the given time and/or given day occurs, the notification may be output without additional user input. In still other examples, the notification may be output as part of a content injection process. For example, a content-injection component may cause the notification may be output when the user otherwise interacts with the voice interface device and/or when the user interacts with the voice interface device in a certain manner. For example, when the application is associated with gaming functionality, the notification may be output when the user provides user input indicating a desire to play the game associated with the application and/or indicating an intent to utilize one or more games. In still other examples, the notification may be sent to a user device that includes the companion application as described herein, and the notification may be displayed via a user interface associated with applications that have been "saved for later" or are otherwise pending. Other notification techniques are also disclosed herein, such as messaging notifications, push notifications, etc.

In examples where the "try in now" functionality was selected instead of the "try it later" functionality, the remote system may determine if account association is required as described above, and if so may cause the electronic device to display the account association page. Once associated, instead of sending a notification as described above, the remote system may send a command to the selected voice interface device to launch the application for use by the voice interface device.

In examples where the electronic device from which the application enablement request was received includes the companion application, the remote system may utilize the companion application to display options associated with enablement of the application. For example, the "try it now" and "try it later" functionality may be displayed through the companion application and the login operations may not be performed in light of the companion application already being installed on the electronic device. Additionally, the companion application may include permissions indicators that may allow a user to indicate permissions associated with use of the application, such as notification permissions, location tracking permissions, etc.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for application launch delay and notification. The system 100 may include, for example, electronic devices, which may include a communal device and/or a personal device. In certain examples, the electronic devices may be include voice interface devices 102 (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). The electronic devices may also include one or more user devices 104, which may include electronic device having a screen configured to display information and receive user input. The electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The user devices 104 may include a mobile phone, tablet, laptop, car, wearable device (ring, watch, etc.), any other device that takes inputs via audio, and/or other computing device that is specifically associated with a given user profile. The electronic devices may be configured to send data to and/or receive data from a remote system 106, such as via a network 108. Additionally, it should be understood that a given space and/or environment may include numerous electronic devices. It should also be understood that when a "space" or "environment" is used herein, those terms mean an area and not necessarily a given room, building, or other structure, unless otherwise specifically described as such.

The voice interface devices 102 may include one or more components, such as, for example, one or more processors 110, one or more network interfaces 112, memory 114, one or more microphones 116, one or more speakers 118, one or more lights 120, and/or one or more displays 122. The microphones 116 may be configured to capture audio, such as user utterances, and generate corresponding audio data. The speakers 118 may be configured to output audio, such as audio corresponding to audio data received from another device and/or the system 104. The lights 120 may be configured to output light, such as light indicating that a notification is available for output via the voice interface device 102. The displays 122 may be configured to display images corresponding to image data, such as image data received from the remote system 106 and/or one or more other devices, such as the user devices 104. It should be understood that while several examples used herein include a voice interface device 102 that allows users to interact therewith via user utterances, one or more other devices, which may not include a voice interface, may be utilized instead of or in addition to voice interface devices 102. In these examples, the device may be configured to send and receive data over the network 108 and to communicate with other devices in the system 100. As such, in each instance where a voice interface device 102 is utilized, a computing device that does not include a voice interface may also or alternatively be used. It should be understood that when voice interface devices 102 are described herein, those voice interface devices 102 may include phones, computers, and/or other computing devices.

The remote system 106 may include components such as, for example, a speech-processing system 124, a login component 126, a launch-delay component 128, a notification component 130, a content-injection component 132, a command component 134, an account-association component 136, and/or a user registry 138. It should be understood that while the speech-processing system 124 and the other components are depicted and/or described as separate from each other in FIG. 1, some or all of the components may be a part of the same system. The speech-processing system 124 may include an automatic speech recognition component (ASR) 140 and/or a natural language understanding component (NLU) 142. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component 142 and/or as determined from user input via a computing device. Skills may be configured to utilize the intent to output data for input to a text-to-speech component 144, a link or other resource locator for audio data, and/or a command to a device, such as the voice interface device 102.

In instances where a voice interface device 102 is utilized, skills may extend the functionality of devices 102, 104 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice interface device 102 and may have been developed specifically to provide given functionality to the voice interface device 102. In examples, a non-skill application may be an application that does not include the functionality of a skill. Skills, as described herein, may be a type of application that may be usable in association with voice interface devices 102 and may have been developed specifically to work in connection with voice interfaces of voice interface devices 102. The application(s) may be configured to cause processor(s) to receive information associated with interactions with the voice interface device 102. The application(s) may also be utilized, in examples, to receive input, such as from a user of a user device 104 and/or the voice interface device 102 and send data and/or instructions associated with the input to one or more other devices.

In examples, some or each of the components of the remote system 106 may include their own processor(s), network interface(s), and/or memory. As such, by way of example, the speech-processing system 124 may include and/or be associated with processor(s), network interface(s), and/or memory. The other components of the remote system 106, such as the launch-delay component 128, may include and/or be associated with different processor(s), network interface(s), and/or memory, or one or more of these components may utilize some or all of the same processor(s), network interface(s), and/or memory utilized by the speech-processing system 124. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 138 may be configured to determine and/or generate associations between users, user accounts, and/or devices. For example, one or more associations between user accounts may be identified, determined, and/or generated by the user registry 138. The user registry 138 may additionally store information indicating one or more applications and/or resources accessible to and/or enabled for a given user account. Additionally, the user registry 138 may include information indicating device identifiers, such as naming identifiers, associated with a given user account, as well as device types associated with the device identifiers. The user registry 138 may also include information indicating user account identifiers, naming indicators of devices associated with user accounts, and/or associations between devices, such as the devices 102, 104. The user registry 138 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. The user registry 138 may also include data indicating which voice interface devices 102 are associated with given user account data and naming indicators of those voice interface devices 102.

The speech-processing system 124 may be configured to receive audio data from the devices 102, 104 and/or other devices and perform speech-processing operations. For example, the ASR component 140 may be configured to generate text data corresponding to the audio data, and the NLU component 142 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play my notifications," the NLU component 142 may identify a "notifications" intent and the payload may be "my notifications." In this example where the intent data indicates an intent to output notifications pending in association with the voice interface device 102, the speech-processing system 124 may call one or more skills to effectuate the intent. Skills, as described herein may otherwise be described as applications and may include functionality for utilizing intent data to generate directives and/or instructions. For example, a notification skill may be called when the intent indicates that notifications are to be output. The skill may be designated as being configured to handle the intent of sending the appropriate notifications and commands to output the notifications to the voice interface device 102, for example. The skill may receive the intent data and/or other data associated with the user utterance from the NLU component 142, such as by an orchestrator of the remote system 106, and may perform operations to instruct the device 102, 104 to output the notification, for example. The remote system 106 may generate audio data confirming that requested notifications have been provided, such as by the text-to-speech component 144. The audio data may be sent from the remote system 106 to the electronic device 102 for output of corresponding audio by the speakers 118 of the device 102.

The various components of the devices 102, 104, and the remote system 106 will now be described by way of example.

A user of a user device 104 may be browsing internet content or otherwise viewing content from one or more websites on the user device 104. In examples, a given website may include a selectable portion associated with a request to enable an application associated with the website for use on one or more electronic devices, such as voice interface devices 102. The selectable portion may correspond to a link, such as a link associated with a uniform resource locator. The selection portion itself may include one or more forms, such as a button or otherwise an image, text, etc. For example, a given website may be associated with one or more games, such as trivia games. A portion of the website may inform the user that a given trivia game is configured to be played using a voice interface device 102 and that, if the user desires, the user can enable the trivia game for use on one or more voice interface devices 102 associated with a user profile of the user by selecting the selectable portion of the website. The user device 104 may receive user input indicating selection of the selectable portion, which may initiate enablement of the application for use via the voice interface devices 102.

To do so, the remote system 106 associated with the voice interface devices 102 may receive, from the user device 104, an indication that the application has been requested to be enabled. The remote system 106 may determine whether the electronic device has installed a companion application associated with the remote system 106. For example, if the user has acquired a voice interface device 102 associated with the remote system 106, a portion of the out-of-the-box experience when setting up the voice interface device 102 may have been to download or otherwise install the companion application on one or more user devices 104, which may enhance the user's experience of utilizing the voice interface device 102. In certain examples, the user device 104 may have the companion application installed on it, while in other examples the user device 104 may not have the companion application installed. When the companion application is not installed, the remote system 106 may determine whether the URL associated with the link in the website is a valid URL or otherwise whether the URL is active and accurately allows access to a resource associated with the remote system 106 for enabling applications. In instances where the URL is not valid, an error message may be displayed on the user device 104 as well as, in examples, directions for other potential ways to enable the application.

In instances where the URL is valid, the login component 126 may determine whether the user device 104 is actively logged in to a user account associated with the remote system 106. For example, the user device 104 may be automatically logged in to the user account, and/or the user may have logged in to the user account at a time prior to selection of the link to enable the application. By way of example, the remote system 106 may be associated with a marketplace system, a smart-home system, an email system, etc. where the user has logged in utilizing the user account to utilize the one or more system. In these examples, particularly when user consent to do so has been provided, the login component 126 may determine that the user device 104 is actively logged in to the user account. When the user device 104 is not actively logged in to the user account, a login page may be displayed that may allow the user to provide user input for logging in to the user account.

Once logged in, the remote system 106 may determine whether user account data indicates that one or more voice interface devices 102 are associated with the user account data. For example, a user may have one, multiple, or no voice interface devices 102, and/or the user may not have associated a voice interface device 102 with the user account data. In instances where the user account data indicates that no voice interface devices 102 are associated with the user account data, the remote system 106 may cause the user device 104 to display a user interface indicating that no voice interface devices 102 are associated with the user account data and may provide directions for acquiring voice interface devices 102 and/or for associating voice interface devices 102 with the user account data. In instances where the user account data indicates one or more voice interface devices 102 are associated with the user account data, the remote system 106 may determine naming indicator(s) of the voice interface device(s) 102 and may cause the user device 104 to display a user interface indicating the naming indicators. In examples, the user interface may also be utilized to display device type indicators of the voice interface devices 102 and/or other information associated with the voice interface devices 102. The naming indicators and/or other information associated with the voice interface devices 102 may be displayed in a first portion of the user interface associated with "try it now" functionality. This first portion of the user interface may be utilized by the user when the user desires to enable and use the application associated with the website at a current time. For example, when the user is in the environment where the voice interface device 102 is disposed and desires to currently utilize the application in conjunction with the voice interface device 102, the user may select a portion of a screen of the user device 104 corresponding to the naming indicator of the voice interface device 102 to be used. In addition to the above, a second portion of the user interface may include a selectable portion associated with "try it later" functionality. This second portion of the user interface may be utilized when the user desires to enable and use the application at a later time. In these examples, the second portion of the user interface may include a selectable portion associated with sending a notification or otherwise delaying enablement and/or use of the application until a time after the current time.

In examples where user input from the user device 104 indicates selection of the second portion of the user interface associated with the "try it later" functionality, the launch-delay component 128 may determine whether a notification is already pending in association with the application and the user account. For example, the user and/or another user associated with the user account data may have previously requested that a notification for enabling the application be sent. In these examples, the launch-delay component 128 may determine that a notification for enabling the application in association with the user account data has already been sent and may determine to refrain from sending another notification. In instances where such a notification is not already pending, the account-association component 136 may determine whether account association requirements are associated with the application. For example, some applications may be associated with sensitive information such as financial data, health-related data, etc. and/or it may be beneficial for the application to have access to the user account data and/or to an account specific to the application. In these examples, enablement of the application may require or optionally request that the user account data and/or the account specific to the application be associated with the application. To do so, the account-association component 136 may cause the user device 104 to display an account association page. The user device 104 may receive user input associated with account association and, once associated, the notification component 130 may generate and send a notification to one or more of the voice interface devices 102 and/or one or more other user devices 104 associated with the user account data.

For example, the command component 134 may send data representing the notification to a voice interface device 102 along with a command that causes the voice interface device 102 to display an indication that a notification is available via the voice interface device 102. The indication may include display of lights and/or output of sounds, for example, indicative of a pending notification. User input data may be received via the voice interface device 102, such as by a microphone 116 of the voice interface device 102 receiving audio representing a user utterance to output the notification. Corresponding audio data may be sent to the speech-processing system 124, and the command component 134 may send a command to the voice interface device 102 to output audio representing the notification. The notification may indicate that enablement of the application has been delayed and may request additional user input indicating a desire to enable the application. In other examples where the device to which the notification was sent includes a screen, the notification may include image data and/or text data that may be displayed on the screen. In still other examples, instead of a notification indicator or in addition to the notification indicator, the notification may output at a given time and/or a given day. In these examples, when the given time and/or given day occurs, the notification may be output without additional user input. In still other examples, the notification may be output as part of a content injection process. For example, the content-injection component 132 may cause the notification may be output when the user otherwise interacts with the voice interface device 102 and/or when the user interacts with the voice interface device 102 in a certain manner. For example, when the application is associated with gaming functionality, the notification may be output when the user provides user input indicating a desire to play games and/or indicating an intent to utilize one or more games. In still other examples, the notification may be sent to a user device 104 that includes the companion application as described herein, and the notification may be displayed via a user interface associated with applications that have been "saved for later." Other notification techniques are also disclosed herein, such as messaging notifications, push notifications, etc.

In examples where the "try in now" functionality was selected instead of the "try it later" functionality, the account-association component 136 may determine if account association is required as described above, and if so may cause the user device 104 to display the account association page. Once associated, instead of sending a notification as described above, the command component 134 may send a command to the selected voice interface device 102 to launch the application for use by the voice interface device 102.

In examples where the user device 104 from which the application enablement request was received includes the companion application, the remote system 106 may utilize the companion application to display options associated with enablement of the application. For example, the "try it now" and "try it later" functionality may be displayed through the companion application and the login operations may not be performed in light of the companion application already being installed on the user device 104. Additionally, the companion application may include permissions indicators that may allow a user to indicate permissions associated with use of the application, such as notification permissions, location tracking permissions, etc.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the devices 102, 104. Additionally, or alternatively, some or all of the components and/or functionalities associated with the devices 102, 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the remote system 106 may enable messages between the components and/or devices shown in system 100 and/or with one or more other polling systems, as well as other networked devices. Such network interface(s) 112 and/or the network interface(s) described with respect to the components of the remote system 106 may include one or more network interface controllers (NICs) or other types of transceiver devices to send and receive messages over the network 108.

For instance, each of the network interface(s) 112 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 106 may include a wide area network (WAN) component to enable message over a wide area network.

In some instances, the remote system 106 may be local to an environment associated the devices 102, 104. For instance, the remote system 106 may be located within one or more of the devices 102, 104. In some instances, some or all of the functionality of the remote system 106 may be performed by one or more of the devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
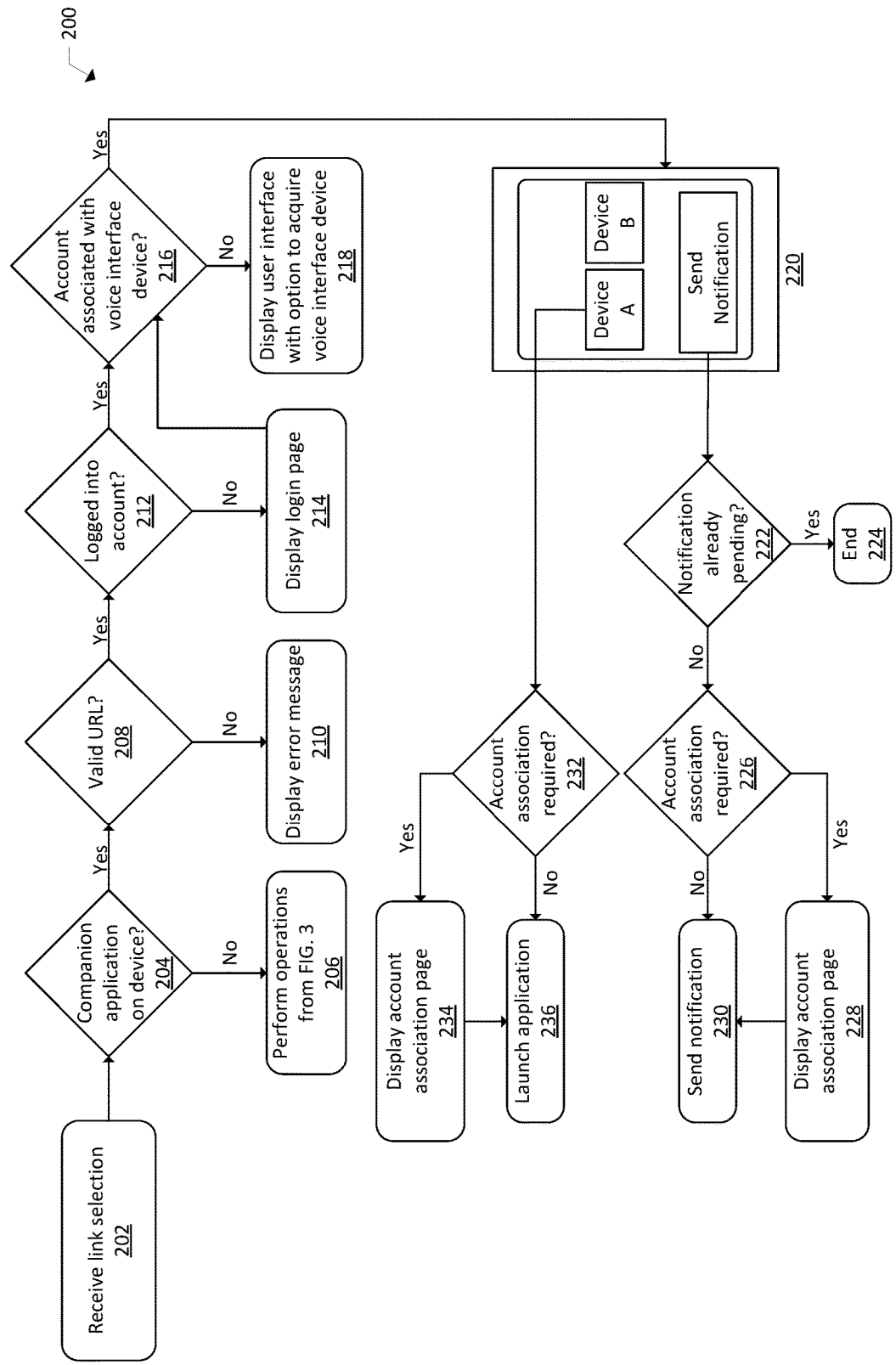
FIG. 2 illustrates a flow diagram of an example process for application launch delays and notifications, where the request to enable an application is received from a device without a companion application.
Figure 3:
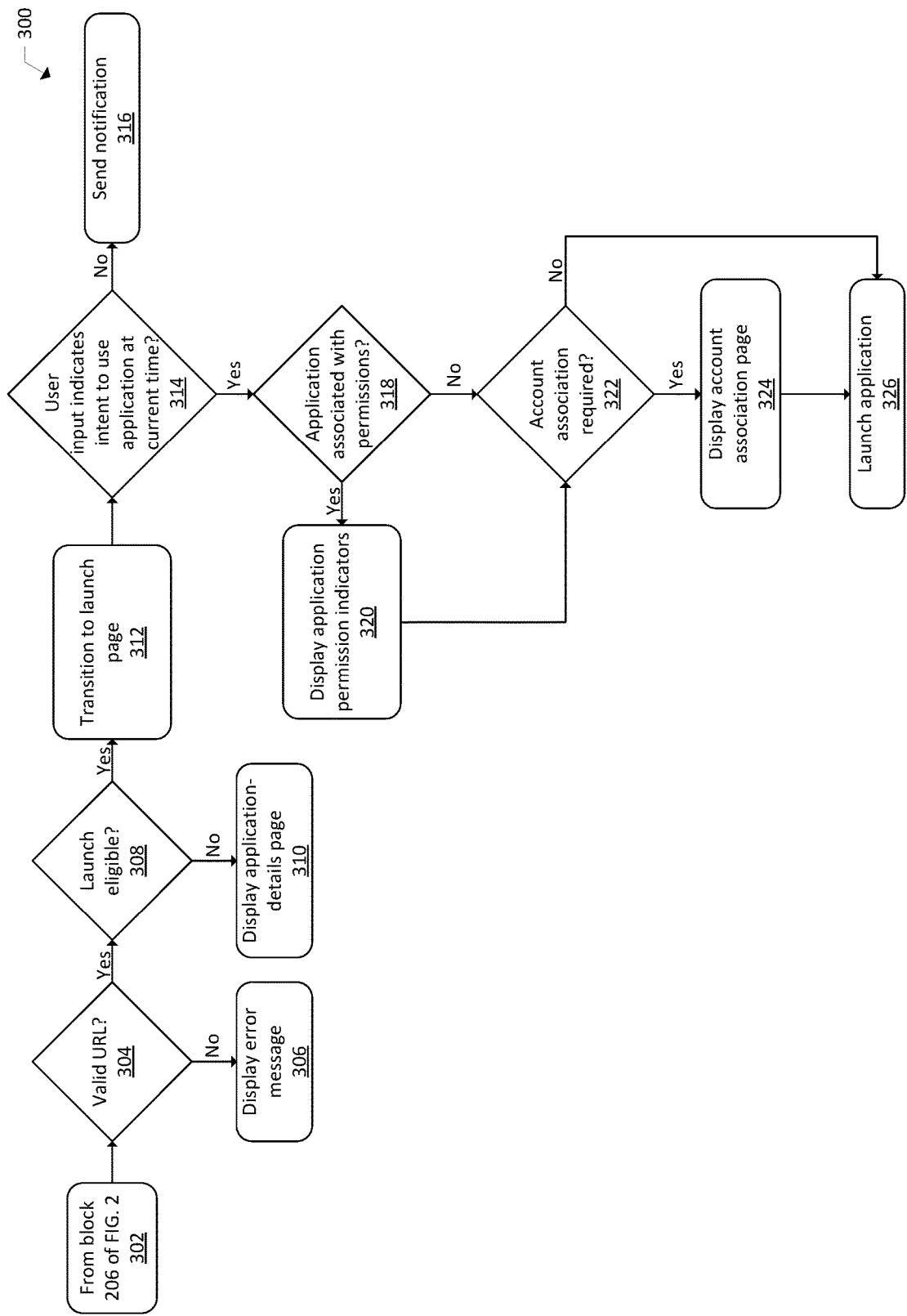
FIG. 3 illustrates a flow diagram of an example process for application launch delays and notifications, where the request to enable an application is received from a device with a companion application.

FIGS. 2 and 3 illustrate processes for application launch delays and notifications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 4-10, although the processes may be implemented in a wide variety of other environments, architectures and systems.

FIG. 2 illustrates a flow diagram of an example process 200 for application launch delays and notifications, where the request to enable an application is received from a device without a companion application. The order in which the operations or steps are described is not intended to be construed as a limitation, and any number of the described operations may be combined in any order and/or in parallel to implement process 200.

At block 202, the process 200 may include receiving a URL link selection from a user device. For example, a user of an electronic device may be browsing internet content or otherwise viewing content from one or more websites on the electronic device. In examples, a given website may include a selectable portion associated with a request to enable an application associated with the website for use on one or more electronic devices, such as voice interface devices. The selectable portion may correspond to a link, such as a link associated with a uniform resource locator. The selection portion itself may include one or more forms, such as a button or otherwise an image, text, etc. For example, a given website may be associated with one or more games, such as trivia games. A portion of the website may inform the user that a given trivia game is configured to be played using a voice interface device and that, if the user desires, the user can enable the trivia game for use on one or more voice interface devices associated with a user profile of the user by selecting the selectable portion of the website. The electronic device may receive user input indicating selection of the selectable portion, which may initiate enablement of the application for use via the voice interface devices.

At block 204, the process 200 may include determining whether a companion application associated with a voice interface device is installed on the user device. For example, the remote system may determine whether the electronic device has installed a companion application associated with the remote system. For example, if the user has acquired a voice interface device associated with the remote system, a portion of the out-of-the-box experience when setting up the voice interface device may have been to download or otherwise install the companion application on one or more user devices, which may enhance the user's experience of utilizing the voice interface device. In certain examples, the electronic device from which the indication that the application has been requested to be enabled may have the companion application installed on it, while in other examples the electronic device may not have the companion application installed.

In instances where the companion application is not installed on the user device, the process 200 may include, at block 206, performing the operations described with respect to FIG. 3 below.

In instances where the companion application is installed on the user device, the process 200 may include, at block 208, determining whether the URL link is valid or otherwise whether the URL is active and accurately allows access to a resource associated with the remote system for enabling applications.

In instances where the URL link is not valid, the process 200 may, at block 210, include displaying an error message. For example, in instances where the URL is not valid, an error message may be displayed on the electronic device as well as, in examples, directions for other potential ways to enable the application.

In instances where the URL link is valid, the process 200 may, at block 212, include determining whether the user device is logged into a user account associated with the remote system. For example, a login component of the remote system may determine whether the electronic device is actively logged in to a user account associated with the remote system. For example, the electronic device may be automatically logged in to the user account, and/or the user may have logged in to the user account at a time prior to selection of the link to enable the application. By way of example, the remote system may be associated with a marketplace system, a smart-home system, an email system, etc. where the user has logged in utilizing the user account to utilize the one or more system.

In instances where the user device is not logged into the user account, the process 200 may, at block 214, include displaying a login page on the user device. For example, a login page may be displayed that may allow the user to provide user input for logging in to the user account.

In instances where the user device is logged into the user account and/or when login information is received via the login page, the process 200 may, at block 216, include determining whether the user account data indicates that at least one voice interface device is associated with the user account data. For example, a user may have one, multiple, or no voice interface devices, and/or the user may not have associated a voice interface device with the user account data.

In instances where the user account data indicates that no voice interface devices are associated with the user account data, the process 200 may, at block 218, include displaying a user interface with an option to acquire a voice interface device.

In instances where the user account data indicates that at least one voice interface device is associated with the user account data, the process 200 may, at block 220, include displaying a user interface with "try it now" and "try it later" functionality. For example, the remote system may determine naming indicator(s) of the voice interface device(s) and may cause the electronic device to display a user interface indicating the naming indicators. In examples, the user interface may also be utilized to display device type indicators of the voice interface devices and/or other information associated with the voice interface devices. The naming indicators and/or other information associated with the voice interface devices may be displayed in a first portion of the user interface associated with "try it now" functionality. This first portion of the user interface may be utilized by the user when the user desires to enable and use the application associated with the website at a current time. For example, when the user is in the environment where the voice interface device is disposed and desires to currently utilize the application in conjunction with the voice interface device, the user may select a portion of a screen of the electronic device corresponding to the naming indicator of the voice interface device to be used. In addition to the above, a second portion of the user interface may include a selectable portion associated with "try it later" functionality. This second portion of the user interface may be utilized when the user desires to enable and use the application at a later time. In these examples, the second portion of the user interface may include a selectable portion associated with sending a notification or otherwise delaying enablement and/or use of the application until a time after the current time.

At block 220, user input may be received that indicates a user selection of a portion of the user interface associated with the "try it later" functionality.

At block 222, the process 200 may include determining whether a notification for enabling the application in association with the user account data is already pending. For example, a launch-delay component of the remote system may determine whether a notification is already pending in association with the application and the user account. For example, the user and/or another user associated with the user account data may have previously requested that a notification for enabling the application be sent. In these examples, the remote system may determine that a notification for enabling the application in association with the user account data has already been sent.

In instances where a notification is already pending, the process 200 may, at block 224, include determining to refrain from generating and/or sending another notification. In other examples, a second notification may be sent, such as, for example, when the previous notification has already been output and/or when the previous notification was sent more than a threshold amount of time from when the second notification is sent.

In instances where a notification is not already pending, the process 200 may, at block 226, include determining whether account association is required and/or desired. For example, some applications may be associated with sensitive information such as financial data, health-related data, etc. and/or it may be beneficial for the application to have access to the user account data and/or to an account specific to the application. In these examples, enablement of the application may require or optionally request that the user account data and/or the account specific to the application be associated with the application.

In instances where account association is required and/or desired, the process 200 may, at block 228, include displaying an account association page on the user device. The account association page may provide one or more fields for input of information to associate accounts, such as username and/or password information.

In instances where account association is not required and/or is not desired and/or when account association information is provided via the account association page, the process 200 may, at block 230, include sending the notification to one or more voice interface devices. For example, a command component of the remote system may send data representing the notification to a voice interface device along with a command that causes the voice interface device to display an indication that a notification is available via the voice interface device. The indication may include display of lights and/or output of sounds, for example, indicative of a pending notification. User input data may be received via the voice interface device, such as by a microphone of the voice interface device receiving audio representing a user utterance to output the notification. Corresponding audio data may be sent to the remote system for speech processing, and the command component may send a command to the voice interface device to output audio representing the notification. The notification may indicate that enablement of the application has been delayed and may request additional user input indicating a desire to enable the application. In other examples where the device to which the notification was sent includes a screen, the notification may include image data and/or text data that may be displayed on the screen. In still other examples, instead of a notification indicator or in addition to the notification indicator, the notification may be output at a given time and/or a given day. In these examples, when the given time and/or given day occurs, the notification may be output without additional user input. In still other examples, the notification may be output as part of a content injection process. For example, a content-injection component may cause the notification may be output when the user otherwise interacts with the voice interface device and/or when the user interacts with the voice interface device in a certain manner. For example, when the application is associated with gaming functionality, the notification may be output when the user provides user input indicating a desire to play games and/or indicating an intent to utilize one or more games. In still other examples, the notification may be sent to a user device that includes the companion application as described herein, and the notification may be displayed via a user interface associated with applications that have been "saved for later." Other notification techniques are also disclosed herein, such as messaging notifications, push notifications, etc.

Returning to block 220, in instances where the user input indicates selection of the "try it now" functionality, the process 200 may, at block 232, include determining whether account association is required and/or desired. This process may be performed as outlined above with respect to the account-association component.

In instances where account association is required and/or desired, the process 200 may, at block 234, include displaying the account association page.

In instances where account association is not required and/or desired, and/or when account association information is provided via the account association page, the process 200 may, at block 236, include launching the application using the voice interface device.

FIG. 3 illustrates a flow diagram of an example process 300 for application launch delays and notifications, where the request to enable an application is received from a device with a companion application. The order in which the operations or steps are described is not intended to be construed as a limitation, and any number of the described operations may be combined in any order and/or in parallel to implement process 300.

At block 302, the process 300 may include one or more of the operations from block 206 of FIG. 2, for example, determining that the user device from which the link request was received includes the companion application. For example, the remote system may determine whether the electronic device has installed a companion application associated with the remote system. For example, if the user has acquired a voice interface device associated with the remote system, a portion of the out-of-the-box experience when setting up the voice interface device may have been to download or otherwise install the companion application on one or more user devices, which may enhance the user's experience of utilizing the voice interface device. In certain examples, the electronic device from which the indication that the application has been requested to be enabled may have the companion application installed on it, while in other examples the electronic device may not have the companion application installed.

At block 304, the process 300 may include determining whether the URL link is valid or otherwise whether the URL is active and accurately allows access to a resource associated with the remote system for enabling applications.

In instances where the URL link is not valid, the process 300, at block 306, may include displaying an error message. For example, in instances where the URL is not valid, an error message may be displayed on the electronic device as well as, in examples, directions for other potential ways to enable the application.

In instances where the URL link is valid, the process 300, at block 308, may include determining whether the application is eligible for automatic launching without further input. For example, a developer of the application may have programmed the application to automatically be enabled at this point in the operational flow such that a user need not provide user input generally needed to enable the application.

In instances where the application is not eligible for automatic launching, the process 300 may, at block 310, include displaying an application-details page with functionality allowing for user input to launch the application. The details page may include an identifier of the application, details about the application, and a selectable portion that, when selected, may cause the user device and/or the remote system to enable the application for use in association with user account data.

In instances where the application is eligible for automatic launching, the process 300 may, at block 312, include automatically transitioning to a launch page to allow for launching of the application.

At block 314, the process 300 may include determining whether user input indicates an intent to utilizing the application at a current time. For example, the remote system may determine naming indicator(s) of the voice interface device (s) and may cause the electronic device to display a user interface indicating the naming indicators. In examples, the user interface may also be utilized to display device type indicators of the voice interface devices and/or other information associated with the voice interface devices. The naming indicators and/or other information associated with the voice interface devices may be displayed in a first portion of the user interface associated with "try it now" functionality. This first portion of the user interface may be utilized by the user when the user desires to enable and use the application associated with the website at a current time. For example, when the user is in the environment where the voice interface device is disposed and desires to currently utilize the application in conjunction with the voice interface device, the user may select a portion of a screen of the electronic device corresponding to the naming indicator of the voice interface device to be used. In addition to the above, a second portion of the user interface may include a selectable portion associated with "try it later" functionality. This second portion of the user interface may be utilized when the user desires to enable and use the application at a later time. In these examples, the second portion of the user interface may include a selectable portion associated with sending a notification and/or otherwise delaying enablement and/or use of the application until a time after the current time.

In instances where the user input indicates an intent to utilize the application at a later time, the process 300 may, at block 316, include sending a notification to a voice interface device. For example, a command component of the remote system may send data representing the notification to a voice interface device along with a command that causes the voice interface device to display an indication that a notification is available via the voice interface device. The indication may include display of lights and/or output of sounds, for example, indicative of a pending notification. User input data may be received via the voice interface device, such as by a microphone of the voice interface device receiving audio representing a user utterance to output the notification. Corresponding audio data may be sent to the remote system for speech processing, and the command component may send a command to the voice interface device to output audio representing the notification. The notification may indicate that enablement of the application has been delayed and may request additional user input indicating a desire to enable the application. In other examples where the device to which the notification was sent includes a screen, the notification may include image data and/or text data that may be displayed on the screen. In still other examples, instead of a notification indicator or in addition to the notification indicator, the notification may be output at a given time and/or a given day. In these examples, when the given time and/or given day occurs, the notification may be output without additional user input. In still other examples, the notification may be output as part of a content injection process. For example, a content-injection component may cause the notification may be output when the user otherwise interacts with the voice interface device and/or when the user interacts with the voice interface device in a certain manner. For example, when the application is associated with gaming functionality, the notification may be output when the user provides user input indicating a desire to play games and/or indicating an intent to utilize one or more games. In still other examples, the notification may be sent to a user device that includes the companion application as described herein, and the notification may be displayed via a user interface associated with applications that have been "saved for later." Other notification techniques are also disclosed herein, such as messaging notifications, push notifications, etc.

In instances where the user input indicates an intent to use the application at a current time, the process 300 may, at block 318, include determining whether the application is associated with one or more permissions. For example, the companion application may include permissions indicators that may allow a user to indicate permissions associated with use of the application, such as notification permissions, location tracking permissions, etc.

In instances where the application is associated with one or more permissions, the process 300 may, at block 320, include displaying indicators of the one or more permissions on the user device. The indicators may be selectable and/or may be associated with selectable portions of a user interface such that the user may select the degree and types of permissions to utilize in association with the application.

In instances where the application is not associated with permissions, and/or once user input has been received indicating permission selections, the process 300 may, at block 322, include determining whether account association is required and/or desirable. For example, some applications may be associated with sensitive information such as financial data, health-related data, etc. and/or it may be beneficial for the application to have access to the user account data and/or to an account specific to the application. In these examples, enablement of the application may require or optionally request that the user account data and/or the account specific to the application be associated with the application.

In instances where account association is required and/or desirable, the process 300 may, at block 324 include displaying an account association page on the user device. The account association page may provide one or more fields for input of information to associate accounts, such as username and/or password information.

In instances where account association is not required and/or desirable, and/or once user input is received via the account association page that associates the user account to the application, the process 300 may, at block 326, include launching the application via the voice interface device.

Figure 4:
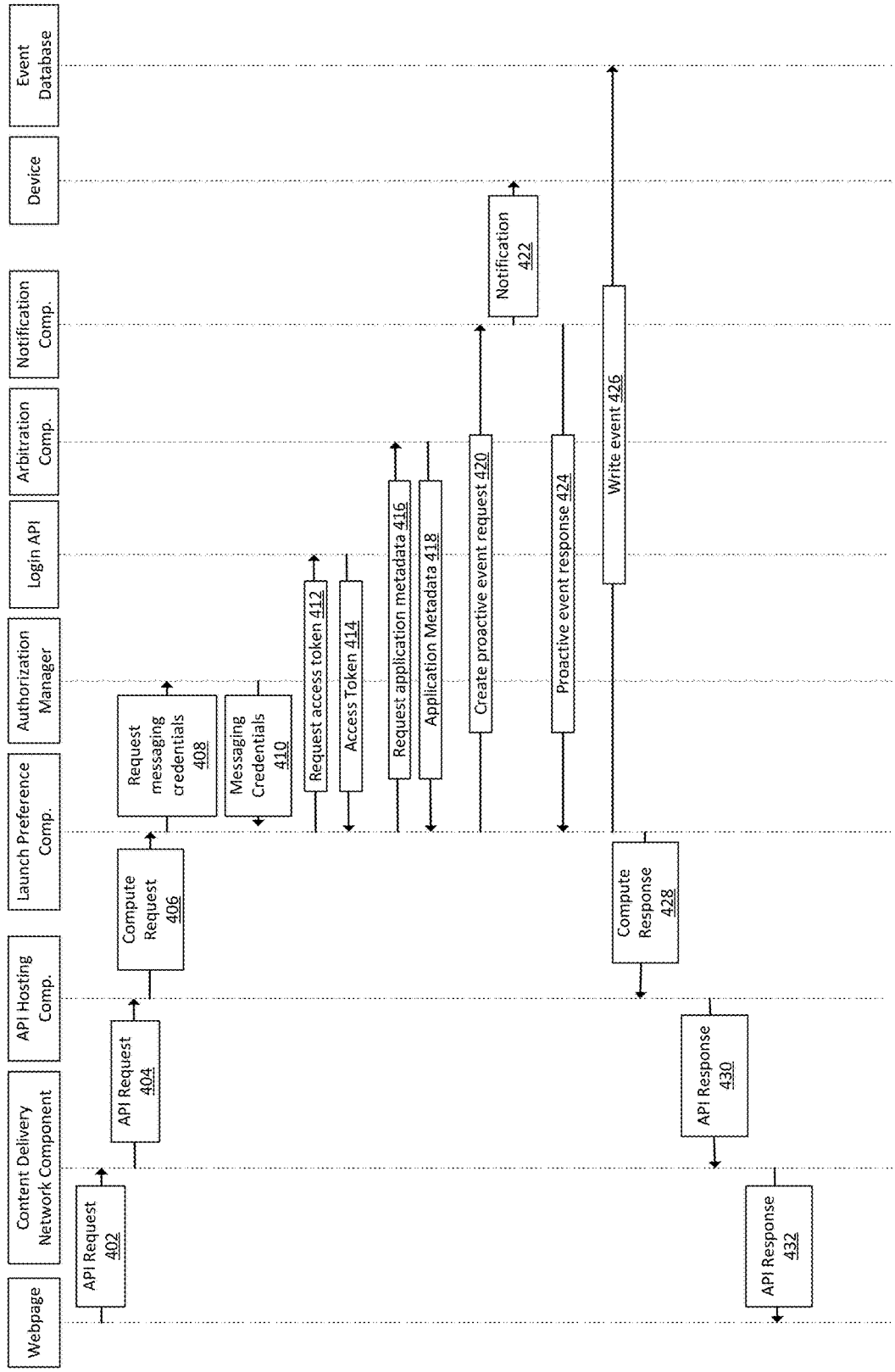
FIG. 4 illustrates a sequence diagram of an example sequence of processes associated with application launch delays and notifications.

FIG. 4 illustrates a sequence diagram of an example sequence of processes associated with application launch delays and notifications. While the sequence diagram depicts the performance of operations and/or the transmission of certain data in a sequential manner, the operations may be performed in a different order than the order depicted in FIG. 4 and/or at least a portion of the operations may be performed in parallel.

At block 402, a webpage associated with a URL link for enabling an application in association with a voice interface device may send an application programming interface (API) request indicating selection of the URL link by the user. The API request may indicate a request by the system associated with the webpage to utilize an API for acquiring data needed to either enable the application at a current time or to send a notification or otherwise remind a user for enablement at a later time.

At block 404, the API request may be received at a content delivery network component of the remote system, which may analyze the API request and determine where to route the request. In these examples, the API request may be routed to an API hosting component configured to handle "save for later" operations associated with delaying application launches until a later time. In addition, customer login authentication may be performed at this time to ensure that the user account associated with the request is authorized to make the request.

At block 406, the API hosting component may send a compute request to one or more cloud computing resources that have been created, provisioned, and/or designated for performing operations associated with "save for later" functionality. Specifically, the computing resources may include a launch preference component, which may receive the compute request.

At block 408, the launch preference component may request messaging credentials from an authorization manager. The messaging credentials may include details about messaging for notifications or other output to a user specific to the application, the user device, the voice interface devices in question, etc.

At block 410, the authorization manager may return the requested messaging credentials to the launch preference component, which may utilize the messaging credentials for further processing at described below.

At block 412, the launch preference component may request one or more access tokens from a login API. For example, the tokens may allow for the system to securely associate information related to the user account in question with information associated with the application and enablement of the application.

At block 414, the login API may return the access token to the launch preference component, which may utilize the token to communicate information securely between components of the system as well as, in examples, components of systems associated with applications.

At block 416, the launch preference component may request metadata from an arbitration component. The metadata may include information associated with the application, such as whether the application is approved for enablement, whether the application is currently available, any restrictions for enablement of the application, whether there are permissions associated with the application, and/or whether the application supports automatic launching or whether user input is needed, for example.

At block 418, the arbitration component may return the requested application metadata to the launch preference component for further processing of the request to enable the application at a later time.

At block 420, the launch preference component may create and send a proactive event request to a notification component. The proactive event request may be associated with generating a notification, command to be utilized during content injection, visual anchor cards, indicators in user interfaces associated with saved applications, etc.

At block 422, the notification component may be utilized to generate the notification as described herein, and the notification component may send the notification to the voice interface device and/or the user device along with a command for causing the user device to display an indicator of the notification.

At block 424, the notification component may send a proactive event response to the launch preference component. The proactive event response may indicate that the proactive event request was accepted and the proactive event was successfully created. The response may also include an indication of the proactive event, such as an identifier of the event and/or information associated with the event.

At block 426, the launch preference component may write the proactive event, which may be stored in an event database to be called when the event occurs. For example, the proactive event may be associated with one or more triggers, such as the occurrence of a given time of day, day of week, receipt of audio data representing a user utterance, such as a specific user utterance, detection of user interaction with the user device and/or the voice interface device, etc.

At block 428, the launch preference component may generate and send a compute response to the API hosting component, which may be in response to the compute request as described above with respect to block 406. The compute response may indicate that the compute request was accepted and that the requested operation(s) were performed, such as the generation of a notification for enabling and/or launching an application at a later time.

At block 430, the API hosting component may generate and send an API response to the content delivery network component, which may be in response to the API request described with respect to block 404. The API response may indicate that the API request was successfully processed and the requested operations were performed.

At block 432, the content delivery network component may send the API response to the system associated with the webpage indicating that the request to enable the application either at a current time or at a later time was successfully processed.

FIG. 5A illustrates a conceptual diagram of a first methodology for delaying application launches. As shown in FIG. 5A, a user device 104 may be in communication with one or more voice interface devices 102, such as through a remote system associated with the voice interface devices. FIG. 5A illustrates various ways that application enablement and/or launch delays may be performed accordingly to the present disclosure.

FIG. 5A illustrates the sending of a notification to a voice interface device 102. For example, user input data may indicate that user input at the user device 104 is associated with selection of functionality associated with a "try it later" option. In the example of FIG. 5A, a remote system may generate data representing a notification to be output by the voice interface device 102 along with a command that, when received at the voice interface device 102, may cause the voice interface device 102 to display an indicator that an notification is available. In examples, the indicator may be emission of light from one or more lighting elements of the voice interface device 102, such as in a certain color or colors, in a certain pattern, and/or at a certain brightness. The indicator may also or alternatively include the display of images and/or text associated with the notification, such as when the voice interface device 102 includes a screen. The indicator may also or alternatively include the output of audio, such as a certain sound or set of sounds indicative of a notification being available. In these examples, user input may be provided to the voice interface device 102 requesting output of the notification, and the data representing the notification may be sent to the voice interface device 102 for output on the voice interface device.

FIG. 5B illustrates a conceptual diagram of a second methodology for delaying application launches. As shown in FIG. 5B, a user device 104 may be in communication with one or more voice interface devices 102, such as through a remote system associated with the voice interface devices. FIG. 5B illustrates various ways that application enablement and/or launch delays may be performed accordingly to the present disclosure.

FIG. 5B illustrates the sending of a notification to the voice interface device 102 to be output without user input requesting output of the notification. For example, while in FIG. 5A a notification is sent that may require user input before being output, the sending of a notification in FIG. 5B may not require additional user input. Instead, the notification may be set such that upon occurrence of an event the notification is output on the voice interface device 102. The event may include, for example, the occurrence of a given time, the expiration of a given amount of time, the occurrence of a given day and/or day of the week, etc.

FIG. 5C illustrates a conceptual diagram of a third methodology for delaying application launches. As shown in FIG. 5C, a user device 104 may be in communication with one or more voice interface devices 102, such as through a remote system associated with the voice interface devices. FIG. 5C illustrates various ways that application enablement and/or launch delays may be performed accordingly to the present disclosure.

FIG. 5C illustrates the output of the notification and/or an indicator of the notification during user interaction with the voice interface device 102. For example, a content injection component may be configured to determine when a user is interacting with the voice interface device 102, and/or when the user is interacting with the voice interface device 102 in a certain way, and may cause the voice interface device 102 to output the notification and/or the indicator of the notification in response to that interaction. For example, when the user provides audio that includes a predefined wake word, and/or when the user provides audio that includes a user utterance, and/or when the voice interface device detects the presence of a user such as through speech recognition and/or signal strength data and/or device beaconing for example, and/or when a given user utterance is associated with the application and/or with an application category, etc., the notification and/or notification indicator may be output.

FIG. 5D illustrates a conceptual diagram of a first methodology for delaying application launches. FIG. 5D illustrates various ways that application enablement and/or launch delays may be performed accordingly to the present disclosure.

FIG. 5D illustrates the output of a notification on the user device 104. For example, an alerts may be displayed on the user device 104 that indicates the application has been "saved for later" enablement and/or launch. In other examples, such as when the user device 104 includes the companion application as described herein, the companion application may include a user interface for viewing applications that have been "saved for later." The companion application may also be used to display reminders that the application has not yet been enabled and/or launched and may provide functionality to accept user input for enabling and/or launching the application.

Figure 6:
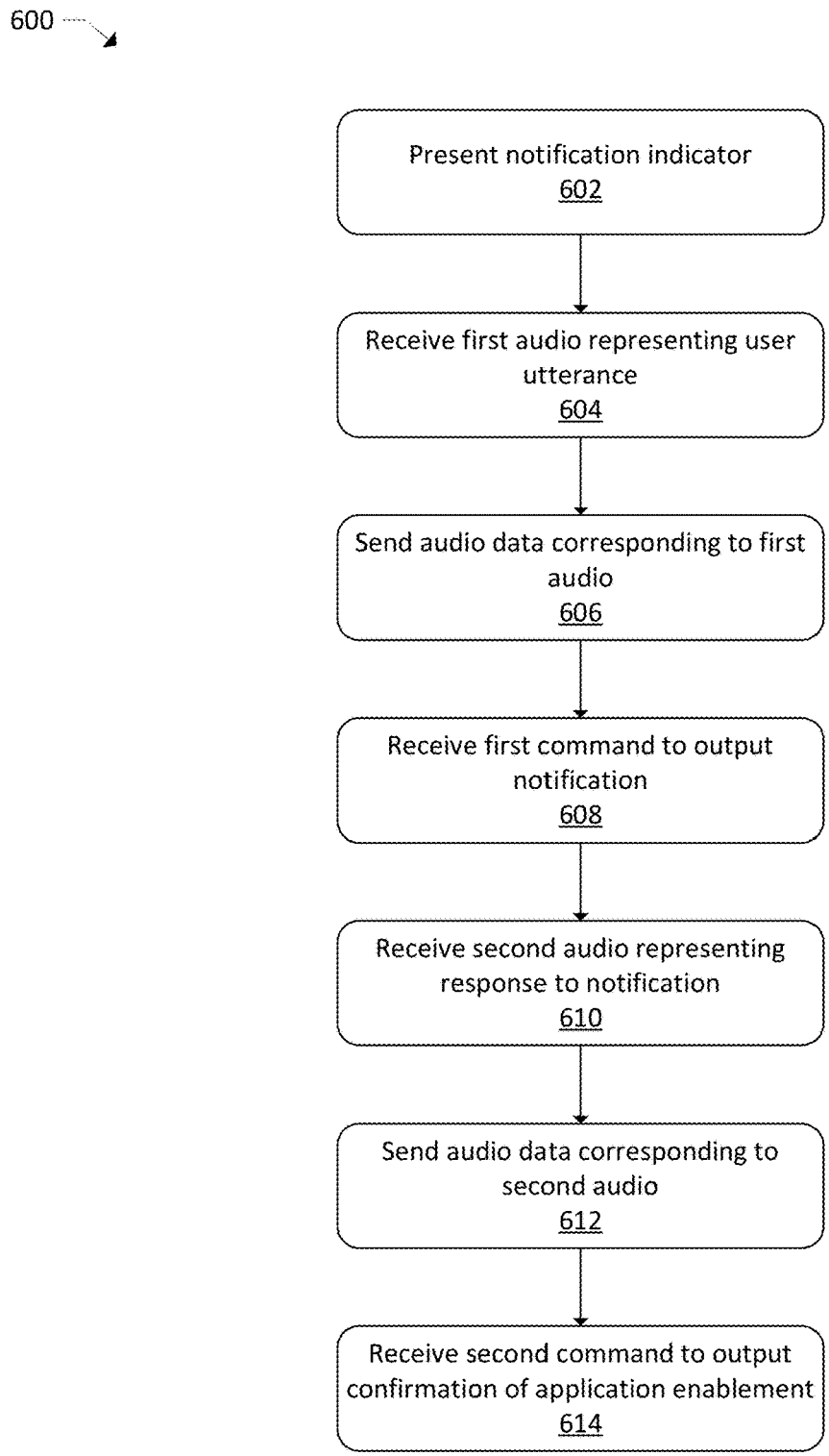
FIG. 6 illustrates a flow diagram of an example process for an electronic device to output a notification associated with delayed application launches.
Figure 8:
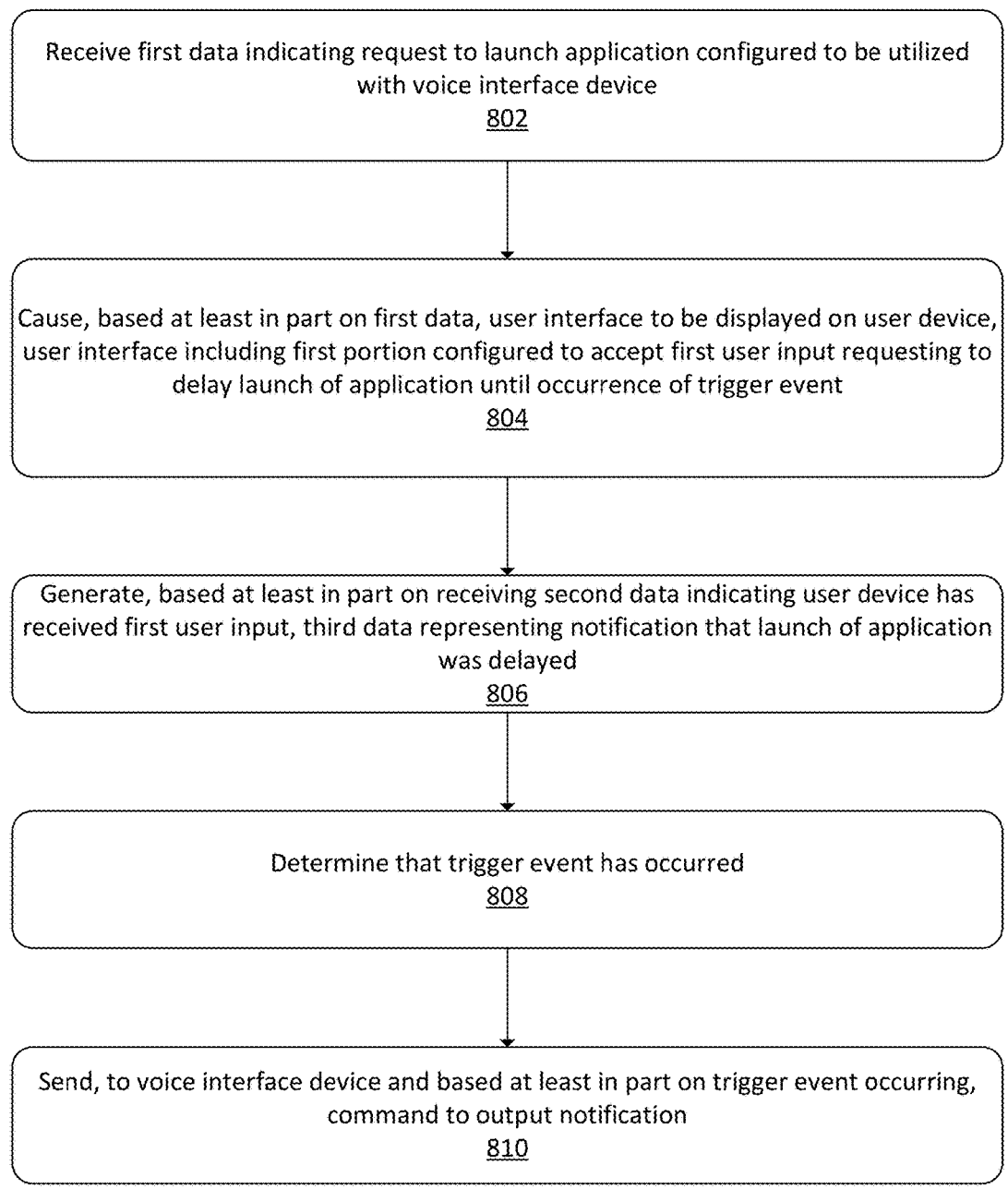
FIG. 8 illustrates a flow diagram of another example process for application launch delays and notifications.

FIGS. 6-8 illustrate processes for application launch delays and notifications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5D, 9 and 10, although the processes may be implemented in a wide variety of other environments, architectures and systems.

FIG. 6 illustrates a flow diagram of an example process 600 for an electronic device to output a notification associated with delayed application launches. The order in which the operations or steps are described is not intended to be construed as a limitation, and any number of the described operations may be combined in any order and/or in parallel to implement process 600.

At block 602, the process 600 may include presenting a notification indicator on the voice interface device. In examples, the indicator may be emission of light from one or more lighting elements of the voice interface device, such as in a certain color or colors, in a certain pattern, and/or at a certain brightness. The indicator may also or alternatively include the display of images and/or text associated with the notification, such as when the voice interface device includes a screen. The indicator may also or alternatively include the output of audio, such as a certain sound or set of sounds indicative of a notification being available.

At block 604, the process 600 may include receiving first audio representing a user utterance. For example, a microphone of the voice interface device may capture the first audio representing the user utterance.

At block 606, the process 600 may include sending audio data corresponding to the first audio to a remote system that includes a speech-processing system. For example, the voice interface device may generate audio data representing the first audio and may send the audio data to the speech-processing system of the remote system for speech processing. The speech processing may include performing ASR and/or NLU techniques to determine intent data associated with the first audio. In these examples, the intent data may indicate that the first audio represents a request to output the notification on the voice interface device. In these examples, a notification skill of the remote system may be called to process the request.

At block 608, the process 600 may include receiving a first command from the remote system to output audio representing the notification. For example, the notification skill may generate the command to output the audio representing the notification and/or may generate and/or retrieve data representing the notification. The command and the data representing the notification may be sent to the voice interface device, which may cause the voice interface device to output the notification.

At block 610, the process 600 may include receiving second audio representing a response to the notification. For example, the microphone of the voice interface device may capture the second audio representing the response to the notification. The response may be, in these examples, an indication that the user now desires to enable and/or launch the application that was previously saved for later. An example of such a user utterance may be "launch it now," "enable it now," or "yes" in response to the notification posing a question of whether the application should be launched and/or enabled.

At block 612, the process 600 may include sending audio data corresponding to the second audio to the speech-processing system. For example, the voice interface device may generate the second audio data corresponding to the second audio and may send the second audio data to the speech-processing system.

At block 614, the process 600 may include receiving a second command from the remote system to output confirmation of application enablement. For example, the speech processing system may process the audio data and may determine intent data indicating that the user utterance requests that the application be currently enabled and/or launched. An enablement skill may be called to perform the application enablement and/or launching operations as described herein. The enablement skill may generate and send one or more commands to the voice interface device to utilize the application on the voice interface device.

FIG. 7 illustrates a flow diagram of an example process 700 for application launch delays and notifications. The order in which the operations or steps are described is not intended to be construed as a limitation, and any number of the described operations may be combined in any order and/or in parallel to implement process 700.

At block 702, the process 700 may include receiving, from a user device, first data indicating that a website has received a request to launch an application associated with the website, the application configured to be utilized with a voice interface device. For example, a user of an electronic device may be browsing internet content or otherwise viewing content from one or more websites on the electronic device. In examples, a given website may include a selectable portion associated with a request to enable an application associated with the website for use on one or more electronic devices, such as voice interface devices. The selectable portion may correspond to a link, such as a link associated with a uniform resource locator. The selection portion itself may include one or more forms, such as a button or otherwise an image, text, etc. For example, a given website may be associated with one or more games, such as trivia games. A portion of the website may inform the user that a given trivia game is configured to be played using a voice interface device and that, if the user desires, the user can enable the trivia game for use on one or more voice interface devices associated with a user profile of the user by selecting the selectable portion of the website. The electronic device may receive user input indicating selection of the selectable portion, which may initiate enablement of the application for use via the voice interface devices.

At block 704, the process 700 may include causing a user interface to be displayed on the user device, the user interface including: a first portion configured to accept first user input to launch the application for use by the voice interface device; and a second portion configured to accept second user input requesting to delay launch of the application until occurrence of a trigger event. For example, the remote system may determine naming indicator(s) of the voice interface device(s) and may cause the electronic device to display a user interface indicating the naming indicators. In examples, the user interface may also be utilized to display device type indicators of the voice interface devices and/or other information associated with the voice interface devices. The naming indicators and/or other information associated with the voice interface devices may be displayed in a first portion of the user interface associated with "try it now" functionality. This first portion of the user interface may be utilized by the user when the user desires to enable and use the application associated with the website at a current time. For example, when the user is in the environment where the voice interface device is disposed and desires to currently utilize the application in conjunction with the voice interface device, the user may select a portion of a screen of the electronic device corresponding to the naming indicator of the voice interface device to be used. In addition to the above, a second portion of the user interface may include a selectable portion associated with "try it later" functionality. This second portion of the user interface may be utilized when the user desires to enable and use the application at a later time. In these examples, the second portion of the user interface may include a selectable portion associated with sending a notification and/or otherwise delaying enablement and/or use of the application until a time after the current time.

At block 706, the process 700 may include receiving second data indicating the user device has received the second user input. For example, the second data may indicate that user input has been received indicating user intent to utilize the "try it later" functionality.

At block 708, the process 700 may include generating, in response to receiving the second data, third data representing a notification that launch of the application was delayed. For example, the notification may indicate the application at issue and/or that the application was selected to be "saved for later," along with, in examples, additional information about the application and/or the circumstances associated with the request to save the application for later use.

At block 710, the process 700 may include determining that the trigger event has occurred, the trigger event corresponding to when output of the notification on the voice interface device is to occur. For example, one or more trigger events may include the occurrence of a given time of day, day of week, receipt of audio data representing a user utterance, such as a specific user utterance, detection of user interaction with the user device and/or the voice interface device, etc. Additional, not limiting examples of triggering events are provided below.

At block 712, the process 700 may include sending, to the voice interface device and in response to the trigger event occurring, a command to output the notification. For example, a remote system may generate data representing a notification to be output by the voice interface device along with a command that, when received at the voice interface device, may cause the voice interface device to display an indicator that an notification is available. In examples, the indicator may be emission of light from one or more lighting elements of the voice interface device, such as in a certain color or colors, in a certain pattern, and/or at a certain brightness. The indicator may also or alternatively include the display of images and/or text associated with the notification, such as when the voice interface device includes a screen. The indicator may also or alternatively include the output of audio, such as a certain sound or set of sounds indicative of a notification being available.

At block 714, the process 700 may include receiving user input data responsive to the notification to launch the application. For example, the voice interface device may generate audio data representing audio input and may send the audio data to the speech-processing system of the remote system for speech processing. The speech processing may include performing ASR and/or NLU techniques to determine intent data associated with the first audio. In these examples, the intent data may indicate that the first audio represents a request to output the notification on the voice interface device. In these examples, a notification skill of the remote system may be called to process the request. A microphone of the voice interface device may capture the audio representing a response to the notification. The response may be, in these examples, an indication that the user now desires to enable and/or launch the application that was previously saved for later. An example of such a user utterance may be "launch it now," "enable it now," or "yes" in response to the notification posing a question of whether the application should be launched and/or enabled.

At block 716, the process 700 may include causing the application to be launched for use by the voice interface device. For example, a user registry may associate the user account data associated with the voice interface device with the application such that the voice interface device is indicated to have permission to utilize the application and the application may be launched.

Additionally, or alternatively, the process 700 may include storing, in association with account data, an indication that the application corresponds to a launch-delayed application. The process 700 may also include receiving, from the voice interface device and prior to sending the command, audio data representing a user utterance. The process 700 may also include determining, from the audio data, intent data requesting to launch the application. The process 700 may also include determining, from the account data, the application corresponds to the launch-delayed application. In these examples, determining that the trigger event has occurred may include determining the intent data requesting to launch the application that corresponds to the launch-delayed application.

Additionally, or alternatively, the process 700 may include receiving, from the voice interface device and prior to sending the command, fourth audio data representing a third user utterance. The process 700 may also include determining, from the fourth audio data, that the third user utterance includes a user request associated with an application category. The process 700 may also include determining that the application is associated with the application category. In these examples, determining that the trigger event has occurred may include determining that the application is associated with the application category from the user request.

Additionally, or alternatively, the process 700 may include in response to receiving the second data indicating the user device has received the second user input, generating request data for information associated with the website, the information indicating user interaction with the website when the first data was received. The process 700 may also include sending the request data to a remote system associated with the website. The process 700 may also include receiving the information. The process 700 may also include storing the information in association with an identifier of the application. The process 700 may also include in response to the application being launched and using the identifier, causing the voice interface device to perform an action associated with the application utilizing the information.

FIG. 8 illustrates a flow diagram of another example process 800 for application launch delays and notifications. The order in which the operations or steps are described is not intended to be construed as a limitation, and any number of the described operations may be combined in any order and/or in parallel to implement process 800.

At block 802, the process 800 may include receiving first data indicating a request to launch an application configured to be utilized with a voice interface device. For example, a user of an electronic device may be browsing internet content or otherwise viewing content from one or more websites on the electronic device. In examples, a given website may include a selectable portion associated with a request to enable an application associated with the website for use on one or more electronic devices, such as voice interface devices. The selectable portion may correspond to a link, such as a link associated with a uniform resource locator. The selection portion itself may include one or more forms, such as a button or otherwise an image, text, etc. For example, a given website may be associated with one or more games, such as trivia games. A portion of the website may inform the user that a given trivia game is configured to be played using a voice interface device and that, if the user desires, the user can enable the trivia game for use on one or more voice interface devices associated with a user profile of the user by selecting the selectable portion of the website. The electronic device may receive user input indicating selection of the selectable portion, which may initiate enablement of the application for use via the voice interface devices.

At block 804, the process 800 may include causing, based at least in part on the first data, a user interface to be displayed on a user device, the user interface including a first portion configured to accept first user input requesting to delay launch of the application until occurrence of a trigger event. For example, the remote system may determine naming indicator(s) of the voice interface device(s) and may cause the electronic device to display a user interface indicating the naming indicators. In examples, the user interface may also be utilized to display device type indicators of the voice interface devices and/or other information associated with the voice interface devices. The naming indicators and/or other information associated with the voice interface devices may be displayed in a first portion of the user interface associated with "try it now" functionality. This first portion of the user interface may be utilized by the user when the user desires to enable and use the application associated with the website at a current time. For example, when the user is in the environment where the voice interface device is disposed and desires to currently utilize the application in conjunction with the voice interface device, the user may select a portion of a screen of the electronic device corresponding to the naming indicator of the voice interface device to be used. In addition to the above, a second portion of the user interface may include a selectable portion associated with "try it later" functionality. This second portion of the user interface may be utilized when the user desires to enable and use the application at a later time. In these examples, the second portion of the user interface may include a selectable portion associated with sending a notification and/or otherwise delaying enablement and/or use of the application until a time after the current time.

At block 806, the process 800 may include generating, based at least in part on receiving second data indicating the user device has received the first user input, third data representing a notification that launch of the application was delayed. For example, the notification may indicate the application at issue and/or that the application was selected to be "saved for later," along with, in examples, additional information about the application and/or the circumstances associated with the request to save the application for later use.

At block 808, the process 800 may include determining that the trigger event has occurred. For example, one or more trigger events may include the occurrence of a given time of day, day of week, receipt of audio data representing a user utterance, such as a specific user utterance, detection of user interaction with the user device and/or the voice interface device, etc. Additional, not limiting examples of triggering events are provided below.

At block 808, the process 800 may include sending, to the voice interface device and based at least in part on the trigger event occurring, a command to output the notification. For example, a remote system may generate data representing a notification to be output by the voice interface device along with a command that, when received at the voice interface device, may cause the voice interface device to display an indicator that an notification is available. In examples, the indicator may be emission of light from one or more lighting elements of the voice interface device, such as in a certain color or colors, in a certain pattern, and/or at a certain brightness. The indicator may also or alternatively include the display of images and/or text associated with the notification, such as when the voice interface device includes a screen. The indicator may also or alternatively include the output of audio, such as a certain sound or set of sounds indicative of a notification being available.

Additionally, or alternatively, the process 800 may include storing, in association with account data, an indication that the application corresponds to a launch-delayed application. The process 800 may also include receiving, from the voice interface device and prior to sending the command, audio data representing a user utterance to launch the application. The process 800 may also include determining, based at least in part on the account data, the application corresponds to the launch-delayed application. In these examples, the trigger event may comprise determining the application that corresponds to the launch-delayed application.

Additionally, or alternatively, the process 800 may include receiving, from the voice interface device and prior to sending the command, audio data representing a user utterance. The process 800 may also include determining, based at least in part on the audio data, that the user utterance includes a user request associated with an application category. The process 800 may also include determining that the application is associated with the application category. In these examples, the trigger event may include determining that the application is associated with the application category.

Additionally, or alternatively, the process 800 may include generating, based at least in part on receiving the second data, request data for information associated with a website from which the first user input was received. The process 800 may also include sending the request data to a system associated with the website. The process 800 may also include receiving the information. The process 800 may also include causing the voice interface device to perform an action associated with the application utilizing the information.

Additionally, or alternatively, the process 800 may include determining, based at least in part on user account data, voice interface devices associated with a user account. The process 800 may also include determining at least a subset of the voice interface devices that are configured to utilize the application, wherein the voice interface device is included in the subset of the voice interface devices. The process 800 may also include selecting, based at least in part on the voice interface device being configured to utilize the application, an indicator of the voice interface device to be display in the first portion of the user interface.

Additionally, or alternatively, the process 800 may include determining that the voice interface device includes a screen. The process 800 may also include generating, based at least in part on the voice interface device including a screen, text data representing the notification. The process 800 may also include generating the command configured to cause the voice interface device to display text corresponding to the text data on the screen.

Additionally, or alternatively, the process 800 may include determining an identifier of the application. In these examples, generating the third data representing the notification may include generating audio data indicating the identifier of the application and indicating that the application was requested to be enabled at the time after the current time.

Additionally, or alternatively, the process 800 may include determining, based at least in part on historical usage data of the application by other voice interface devices, a time of day that the application is likely to be used. In these examples, the trigger event may comprise the time of day occurring.

Additionally, or alternatively, the process 800 may include determining, based at least in part on user account data, that the voice interface device is configured to perform an action as part of a preestablished routine. The process 800 may also include determining that the action is associated with the application. In these examples, the trigger event may comprise the action being performed.

Additionally, or alternatively, the process 800 may include receiving first input data requesting the application to be launched in response to the notification. The process 800 may also include determining that the application has a requirement to associate the application with user account data. The process 800 may also include sending, to the user device, request data to associate the application with the user account data. The process 800 may also include receiving second input data associating the application with the user account data. The process 800 may also include causing the application to be enabled for use by the voice interface device based at least in part on the second input data.

Figure 9:
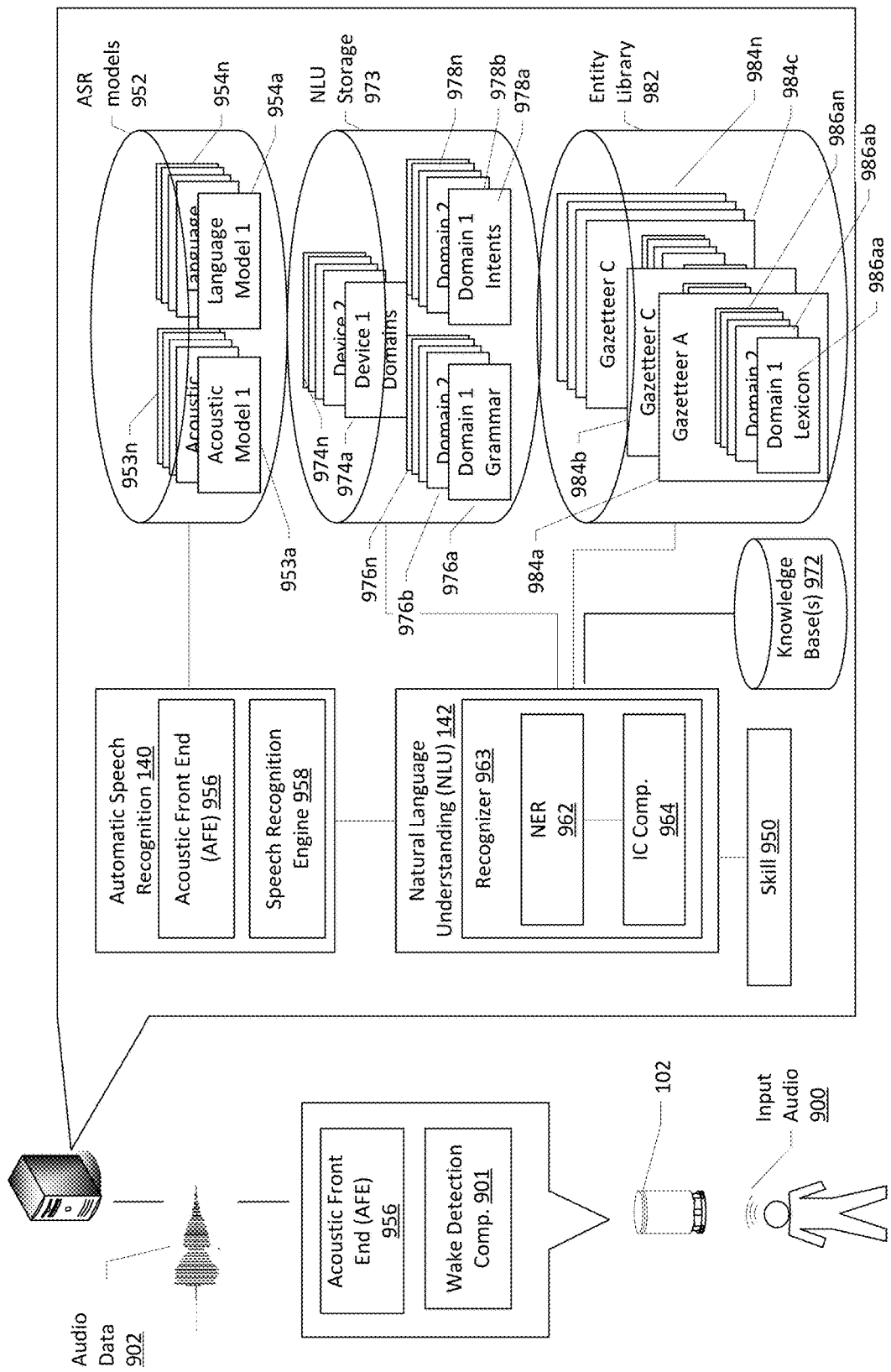
FIG. 9 illustrates a conceptual diagram of components of a speech-processing system for processing audio data provided by one or more devices.

FIG. 9 illustrates a conceptual diagram of components of a speech-processing system for processing audio data provided by one or more devices. FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 9 may occur directly or across a network 108. An audio capture component, such as a microphone 116 of the device 102, or another device, captures audio 900 corresponding to a spoken utterance. The device 102, using a wake word engine 901, then processes audio data corresponding to the audio 900 to determine if a keyword (such as a wakeword) is detected in the audio data. Following detection of a wakeword, the device 102 sends audio data 902 corresponding to the utterance to the remote system 104 that includes an ASR component 140. The audio data 902 may be output from an optional acoustic front end (AFE) 956 located on the device prior to transmission. In other instances, the audio data 902 may be in a different form for processing by a remote AFE 956, such as the AFE 956 located with the ASR component 140 of the remote system 106.

The wake word engine 901 works in conjunction with other components of the user device (which, when used herein, may be the device 102, the device 104, and/or another device), for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signalto-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending.

Further, a local device may "wake" upon detection of speech/spoken audio above a threshold, as described herein. Upon receipt by the remote system 106, an ASR component 140 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 106 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play notifications?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 958 may identify, determine, and/or generate text data corresponding to the user utterance, here "play notifications."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 142 (e.g., server 106) may include various components, including potentially dedicated processor(s), memory, storage, etc. As shown in FIG. 9, an NLU component 142 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice interface devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 900) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "play notifications" the NLU process may determine that the user intended to have notifications output by one or more devices.

The NLU 142 may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "play notifications," "play" may be tagged as a command (to output images and/or audio) and "notifications" may be tagged as the category of the content to be output.

To correctly perform NLU processing of speech input, an NLU process 142 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978*a*-978*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a skill 950. The destination skill 950 may be determined based on the NLU output. For example, if the NLU output includes a command to send a message, the destination skill 950 may be a message sending application, such as one located on the user device or in a message sending appliance, configured to execute a message sending command. If the NLU output includes a search request, the destination application 136 may include a search engine processor, such as one located on a search server, configured to execute a search command. After the appropriate command is generated based on the intent of the user, the skill 950 may provide some or all of this information to a text-to-speech (TTS) engine. The TTS engine may then generate an actual audio file for outputting the audio data determined by the skill 950 (e.g., "okay," or "playing notifications"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
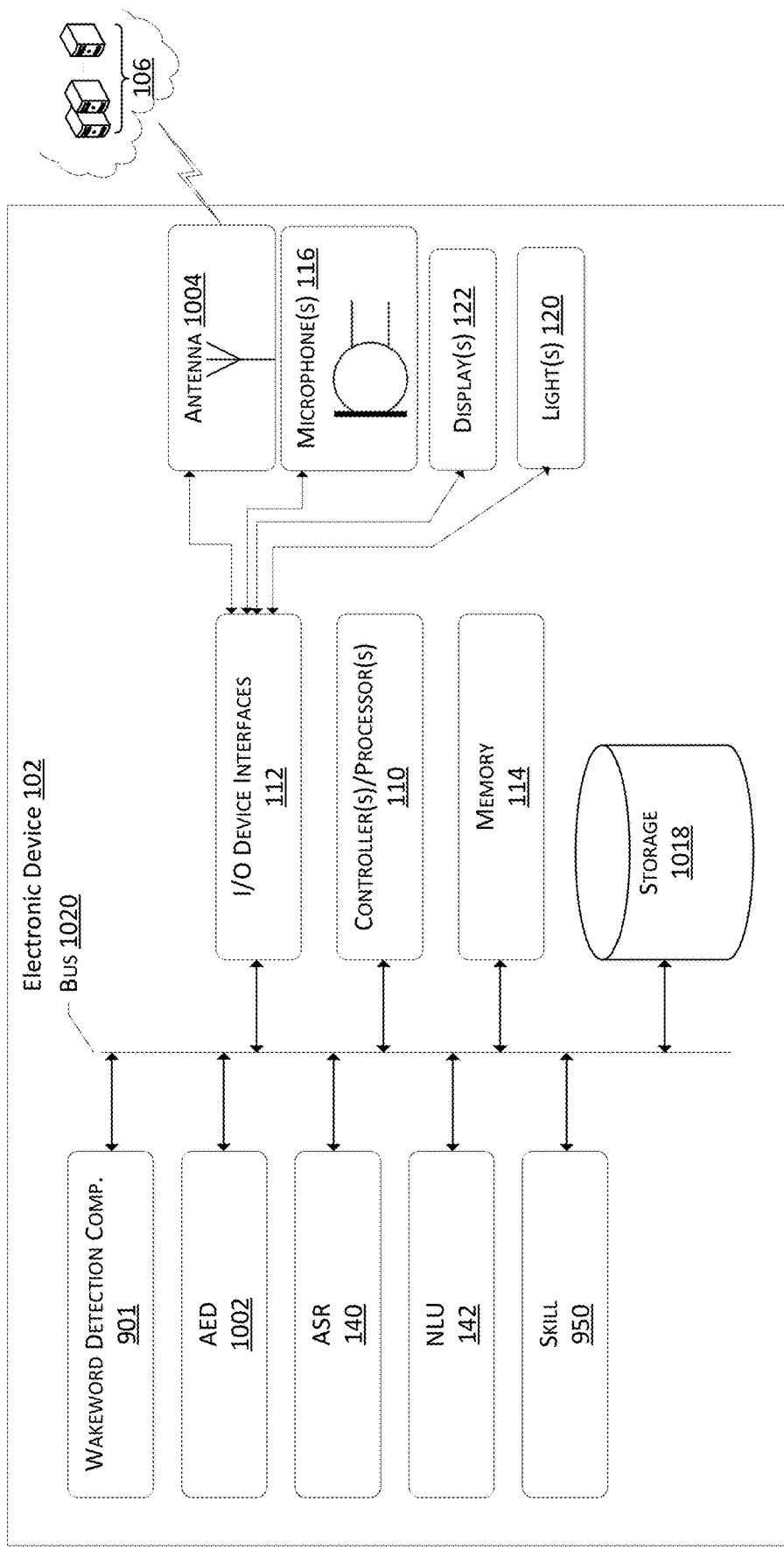
FIG. 10 illustrates a conceptual diagram of example components of an electronic device that may be utilized in association with application launch delays and notifications.

FIG. 10 illustrates a conceptual diagram of example components of an electronic device that may be utilized in association with delayed application launches and notifications. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 1004 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 1018, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1020 for conveying data among components of the respective device. Each component within a device 102 may also be directly connected to other components in addition to, or instead of, being connected to other components across the bus 1020.

The device 102 may include a display 122, which may comprise a touch interface. Any suitable display technology, such as liquid crystal display (LCD), organic light emitting diode (OLED), electrophoretic, and so on, may be utilized for the displays 122. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s) 120, which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 901, ASR component 140, etc.) may be configured to generate audio data corresponding to captured audio. The device 102 (using input/output device interfaces 112, antenna 1004, etc.) may also be configured to transmit the audio data to the remote system 106 for further processing or to process the data using internal components such as a wakeword detection component 901.

Via the antenna(s) 1004, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 106 may include an ASR component 140. The ASR component 140 of device 102 may be of limited or extended capabilities. The ASR component 140 may include language models stored in ASR model storage component, and an ASR component 140 that performs automatic speech recognition. If limited speech recognition is included, the ASR component 140 may be configured to identify a limited number of words, such as keywords detected by the device, whereas extended speech recognition may be configured to recognize a much larger range of words.

The device 102 and/or the remote system 106 may include a limited or extended NLU component 142. The NLU component 142 of device 102 may be of limited or extended capabilities. The NLU component 142 may comprise a name entity recognition module, an intent classification module and/or other components. The NLU component 142 may also include a stored knowledge base and/or entity library, or those storages may be separately located.

In examples, AED 1002 may also be performed by the device 102. In these examples, the operations may include causing the AED component 1002 to be enabled or otherwise turned on, or the operations may include causing the AED component 1002 to transition from a first mode to a second mode representing a higher sensitivity to audio data generated by the microphone 116. The AED component 1002 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 1002 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 1002 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include skill 950 that is configured to execute commands/functions associated with a spoken command as described herein. The device 102 may include a wake word engine, which may be a separate component or may be included in an ASR component 140. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

Figure 11:
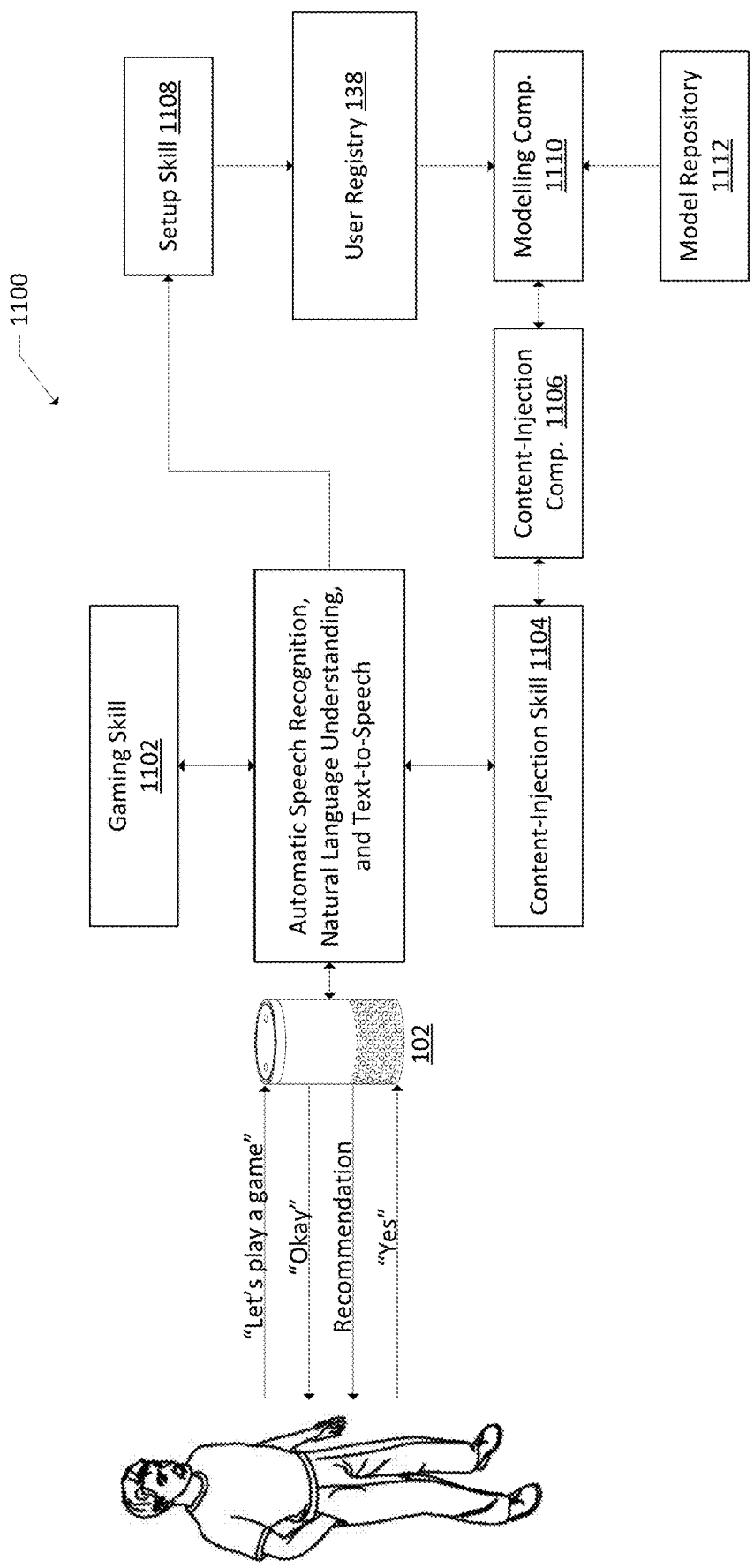
FIG. 11 illustrates a conceptual diagram of components utilized for injecting content into an interaction between a user and an electronic device.

FIG. 11 illustrates a conceptual diagram of example components of devices and systems used for content injection during a user interaction with an electronic device. The system 1100 illustrated with respect to FIG. 11 shows conceptual components of the remote system 106 along with a voice interface device 102 and a user interacting therewith. FIG. 11 describes the functionality of the remote system 106 in the context of an example user utterance provided by the user.

For example, the user may provide a user utterance such as "let's play a game." The microphones of the voice interface device 102 may capture audio corresponding to the user utterance and may generate audio data. The audio data may be sent from the voice interface device 102 to the remote system 106. For example, an ASR component 140 may generate text data corresponding to the audio data. An NLU component 142 may generate, based at least in part on the audio data, intent data representing an intent to perform an action. A text-to-speech (TTS) component 144 may generate audio data from text data for output via speakers of the voice interface device 102. The ASR component 140, NLU component 142, and TTS component 144 are described in more detail with respect to FIG. 9. In the example provided with respect to FIG. 11, the intent may be, for example, to play a game utilizing the voice interface device 102. Based at least in part on the intent data, a skill configured to handle the intent may be utilized. For example, a gaming skill 1102 may receive the intent data and may utilize that intent data to generate directive data representing a directive for the voice interface device 102 to perform one or more functions associated with one or more games. The directive data may be sent to the voice interface device 102, which may perform the operations associated with the one or more games.

Additionally, the remote system 106 may provide a notification to the user as described herein, such as a notification of a delayed launch of an application. For example, a notification may be provided based at least in part on the user providing the user utterance and/or the audio data corresponding to the user utterance being received by the remote system 106. A modelling component 1110 may be configured to utilize data stored in the user registry 138 to determine and/or predict useful information to be utilized by the remote system 106. For example, the modelling component 1110 may be configured to utilize one or more models to determine when to output a given notification, such as based at least in part on the application associated with the notification, a time of day, day of the week, prior user interactions, speaker recognition results, the user utterance provided by the user, etc. The models may be stored in a model repository 1112.

The content-injection skill 1104 may be configured to interface between the modelling component 1110 and other components of the remote system 106, such as the ASR component 140 and/or the NLU component 142. For example, when notification data is generated as described herein, the content-injection skill 1104 may be utilized to generate directive data to be sent to the voice interface device 102 for output of the recommendation to the user. Additionally, the user's response may be captured by the voice interface device 102 and the content-injection component 1106 may be configured to utilize the response to perform actions, such as causing output of the notifications described herein. As shown in FIG. 11, the content-injection skill 1104 may be utilized to inject the notification data into the flow of interactions with the user. For example, in addition to outputting audio associated with the command of playing a game, here illustrated as "okay," the content-injection skill 1104 may cause audio data corresponding to the notification to be sent to the voice interface device 102 for output.

For example, the notification of "would you like to launch Application A that you saved for later?" may be output by the speakers of the voice interface device 102. The user may then provide a user utterance of "yes," which may be captured by the microphones of the voice interface device 102 and corresponding audio data may be generated and sent to the remote system 106. The audio data may be analyzed and intent data indicating an intent to launch Application A. Thereafter, a setup skill 1108 may be called to generate the association between the device and the application. Data indicating the association between the device and the application may be stored, for example, in the user registry 138.

The content injection component 1106 may be allow developers to enhance user interaction by injecting content and/or directive data into available opportunity slots associated with intent data. The slots may be time periods when the customer is open to new interactions. As illustrated in FIG. 11, the time period is after a user provides a user utterance to the voice interface device 102 and while that user utterance is being processed. Other example time periods may be different times of the day, days of the week, after and/or before a user may take a particular action such as interacting with a companion application on a personal device associated with the user, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a user device, first data indicating that a website has received a request to launch an application associated with the website, the application configured to be utilized with a voice interface device;
causing a user interface to be displayed on the user device, the user interface including:
a first portion configured to accept first user input to launch the application for use by the voice interface device; and
a second portion configured to accept second user input requesting to delay launch of the application for use by the voice interface device until occurrence of a trigger event;
receiving second data indicating the user device has received the second user input;
generating, in response to receiving the second data, third data representing a notification that launch of the application was delayed;
receiving, from the voice interface device, audio data representing a user utterance;
determining, based at least in part on the audio data, that the audio data represents a user request associated with an application category of the application;
determining that the trigger event has occurred based at least in part on the user request being associated with the application category, the trigger event corresponding to when output of the notification on the voice interface device is to occur, the notification indicating that launch of the application was delayed and the application is available for use with the voice interface device;
sending, to the voice interface device and in response to the trigger event occurring, a command to output the notification;
receiving user input data responsive to the notification to launch the application; and
causing the application to be launched for use by the voice interface device.

2. The system of claim 1, the operations further comprising:

in response to receiving the second data indicating the user device has received the second user input, generating request data for information associated with the website, the information indicating user interaction with the website when the first data was received;
sending the request data to a remote system associated with the web site;
receiving the information;
storing the information in association with an identifier of the application; and
in response to the application being launched and using the identifier, causing the voice interface device to perform an action associated with the application utilizing the information.

3. A method, comprising:

receiving first data indicating a request to launch an application configured to be utilized with a voice interface device;
causing, based at least in part on the first data, a user interface to be displayed on a user device, the user interface including a first portion configured to accept first user input requesting to delay launch of the application for use by the voice interface device until occurrence of a trigger event;
generating, based at least in part on receiving second data indicating the user device has received the first user input, third data representing a notification that launch of the application was delayed;
determining, based at least in part on audio data received from the voice interface device, that the audio data represents a user request associated with an application category of the application;
determining that the trigger event has occurred based at least in part on the user request being associated with the application category; and
sending, to the voice interface device and based at least in part on the trigger event occurring, a command to output the notification, the notification indicating that launch of the application was delayed and the application is available for use with the voice interface device.

4. The method of claim 3, further comprising:

generating, based at least in part on receiving the second data, request data for information associated with a web site from which the first user input was received;
sending the request data to a system associated with the website;
receiving the information; and
causing the voice interface device to perform an action associated with the application utilizing the information.

5. The method of claim 3, further comprising:

determining, based at least in part on user account data, voice interface devices associated with a user account;
determining at least a subset of the voice interface devices that are configured to utilize the application, wherein the voice interface device is included in the subset of the voice interface devices; and
selecting, based at least in part on the voice interface device being configured to utilize the application, an indicator of the voice interface device to be displayed by the user interface.

6. The method of claim 3, further comprising:

determining, based at least in part on historical usage data of the application by other voice interface devices, a time of day that the application is likely to be used; and
wherein determining that the trigger event has occurred is based at least in part on the time of day.

7. The method of claim 3, further comprising:

determining, based at least in part on user account data, that the voice interface device is configured to perform an action as part of a preestablished routine;
determining that the action is associated with the application; and
wherein determining that the trigger event has occurred is based at least in part on the action.

8. The method of claim 3, further comprising:

receiving first input data requesting the application to be launched in response to the notification;
determining that the application has a requirement to associate the application with user account data;
sending, to the user device, request data to associate the application with the user account data;
receiving second input data associating the application with the user account data; and
causing the application to be enabled for use by the voice interface device based at least in part on the second input data.

9. The method of claim 3, further comprising:

determining application metadata based at least in part on context data associated with receipt of the first user input; and
causing the application to be enabled for use by the voice interface device utilizing the application metadata.

10. The method of claim 3, further comprising selecting a notification type of the notification based at least in part on a configuration of the voice interface device.

11. The method of claim 3, further comprising:

determining that the application is associated with a permission requirement;
determining that account data associated with the voice interface device indicates the permission requirement is satisfied; and
causing the application to be enabled for use by the voice interface device based at least in part on the permission requirement being satisfied.

12. A system, comprising:

one or more processors; and
non-transitory computer-readable media storing computer-executable instructions that, when executed by the one or more processors, cause the one or more processors to perform operations comprising:
receiving first data indicating a request to launch an application configured to be utilized with a voice interface device;
causing, based at least in part on the first data, a user interface to be displayed on a user device, the user interface including a first portion configured to accept first user input requesting to delay launch of the application for use by the voice interface device until occurrence of a trigger event associated with the voice interface device;
generating, based at least in part on receiving second data indicating the user device has received the first user input, third data representing a notification that launch of the application was delayed;
determining that audio data receiving from the voice interface device indicates the trigger event has occurred, the audio data representing a user request associated with an application category of the application; and
sending, to the voice interface device and based at least in part on the trigger event occurring, a command to output the notification, the notification indicating that launch of the application was delayed and the application is available for use with the voice interface device.

13. The system of claim 12, the operations further comprising:
    generating, based at least in part on receiving the second data, request data for information associated with a web site from which the first user input was received;
    sending the request data to a system associated with the website;
    receiving the information; and
    causing the voice interface device to perform an action associated with the application utilizing the information.

14. The system of claim 12, the operations further comprising:
    determining, based at least in part on user account data, voice interface devices associated with a user account;
    determining at least a subset of the voice interface devices that are configured to utilize the application, wherein the voice interface device is included in the subset of the voice interface devices; and
    selecting, based at least in part on the voice interface device being configured to utilize the application, an indicator of the voice interface device to be displayed by the user interface.

15. The system of claim 12, further comprising:
    determining, based at least in part on historical usage data of the application by other voice interface devices, a time of day that the application is likely to be used; and
    wherein the trigger event occurring is based at least in part on the time of day.

16. The system of claim 12, the operations further comprising:
    determining, based at least in part on user account data, that the voice interface device is configured to perform an action as part of a preestablished routine;
    determining that the action is associated with the application; and
    wherein the trigger event occurring is based at least in part on the action.

17. The system of claim 12, the operations further comprising:
    receiving first input data requesting the application to be launched in response to the notification;
    determining that the application has a requirement to associate the application with user account data;
    sending, to the user device, request data to associate the application with the user account data;
    receiving second input data associating the application with the user account data; and
    causing the application to be enabled for use by the voice interface device based at least in part on the second input data.

18. The system of claim 12, the operations further comprising:
    determining application metadata based at least in part on context data associated with receipt of the first user input; and
    causing the application to be enabled for use by the voice interface device utilizing the application metadata.

19. The system of claim 12, the operations further comprising selecting a notification type of the notification based at least in part on a configuration of the voice interface device.

20. The system of claim 12, the operations further comprising:
    determining that the application is associated with a permission requirement;
    determining that account data associated with the voice interface device indicates the permission requirement is satisfied; and
    causing the application to be enabled for use by the voice interface device based at least in part on the permission requirement being satisfied.

* * * * *